(12) United States Patent
Nagami

(10) Patent No.: US 7,975,350 B2
(45) Date of Patent: Jul. 12, 2011

(54) MONITOR HINGE DEVICE

(75) Inventor: Tetsuro Nagami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 39 days.

(21) Appl. No.: 12/595,941

(22) PCT Filed: Feb. 5, 2008

(86) PCT No.: PCT/JP2008/000144
§ 371 (c)(1), (2), (4) Date: Oct. 14, 2009

(87) PCT Pub. No.: WO2008/146428
PCT Pub. Date: Dec. 4, 2008

(65) Prior Publication Data
US 2010/0128458 A1 May 27, 2010

(30) Foreign Application Priority Data

May 28, 2007 (JP) .................................. 2007-140730

(51) Int. Cl.
*E05D 3/10* (2006.01)
(52) U.S. Cl. ................. 16/367; 16/340; 16/334; 16/386
(58) Field of Classification Search ............ 16/367, 16/386, 338–340, 330, 303, 380; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| 5,205,017 | A | * | 4/1993 | Wang | 16/367 |
| 5,982,429 | A | * | 11/1999 | Kamamoto et al. | 348/333.06 |
| 6,256,837 | B1 | * | 7/2001 | Lan et al. | 16/334 |
| 6,427,288 | B1 | * | 8/2002 | Saito | 16/361 |
| 6,798,646 | B2 | * | 9/2004 | Hsu | 361/679.06 |
| 7,021,728 | B2 | * | 4/2006 | Donovan et al. | 312/7.2 |
| 2004/0105227 | A1 | | 6/2004 | Tanimoto et al. | |
| 2005/0268429 | A1 | * | 12/2005 | Akiyama et al. | 16/221 |
| 2005/0283949 | A1 | * | 12/2005 | Lu et al. | 16/367 |
| 2006/0021195 | A1 | * | 2/2006 | Yamada et al. | 16/367 |
| 2006/0230580 | A1 | * | 10/2006 | Watanabe et al. | 16/367 |
| 2006/0288385 | A1 | * | 12/2006 | Vitito | 725/77 |

FOREIGN PATENT DOCUMENTS

JP 3079559 U 6/2001

(Continued)

*Primary Examiner* — Chuck Y. Mah
(74) *Attorney, Agent, or Firm* — Birch, Stewart, Kolasch & Birch, LLP

(57) ABSTRACT

A monitor hinge device includes engagement projections 42, and engaging holes 43a, 43b, 44a, and 44b for enabling a monitor 3 to be opened and closed about a first rotation central axis X and for enabling the above-mentioned monitor 3 which has been rotated about the above-mentioned first rotation central axis X in an opening direction to be rotated about a second rotation central axis Y perpendicular to the above-mentioned first rotation central axis X, and for positioning the above-mentioned monitor 3 at a position at which the above-mentioned monitor 3 is rotated by a predetermined amount with respect to the above-mentioned first rotation central axis X and for positioning the above-mentioned monitor 3 which has been rotated about the above-mentioned second rotation central axis Y at a position at which the above-mentioned monitor 3 is rotated by a predetermined amount with respect to the above-mentioned first rotation central axis X.

10 Claims, 28 Drawing Sheets

FOREIGN PATENT DOCUMENTS

| | | |
|---|---|---|
| JP | 2002-240642 A | 8/2002 |
| JP | 2003-120652 A | 4/2003 |
| JP | 2004-94647 A | 3/2004 |
| JP | 2006105275 A * | 4/2006 |
| WO | WO99/00976 A1 | 1/1999 |

* cited by examiner

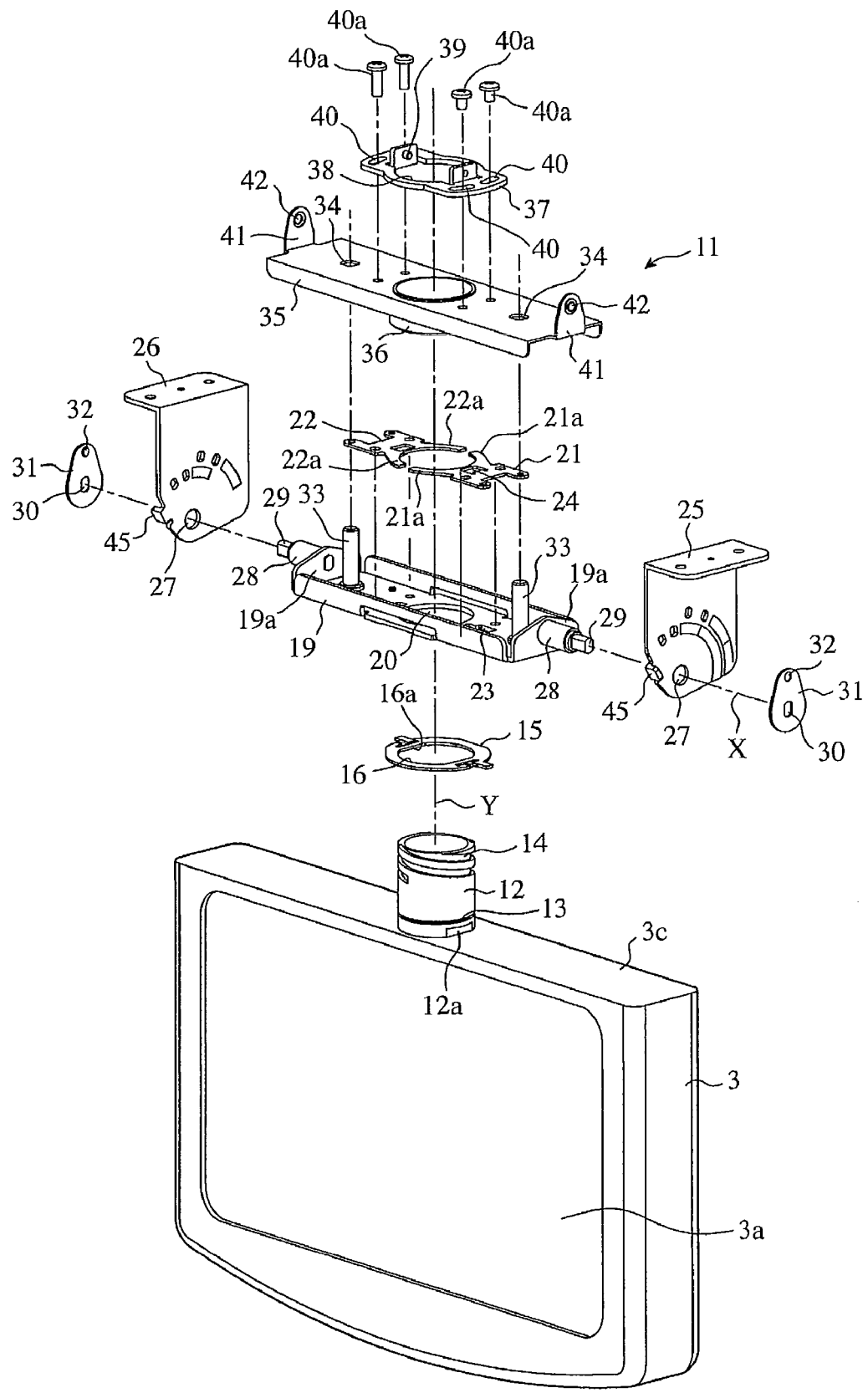

FIG. 18
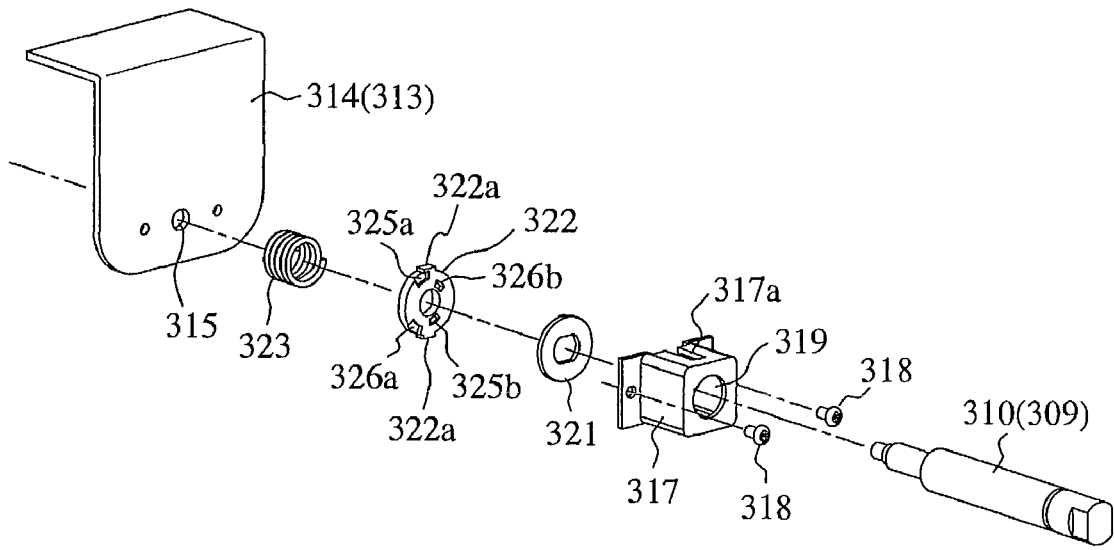
FIG. 19A
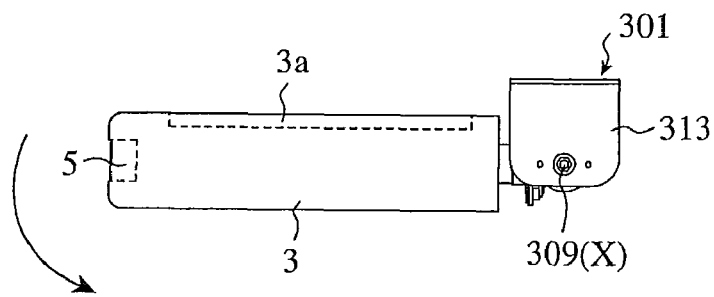
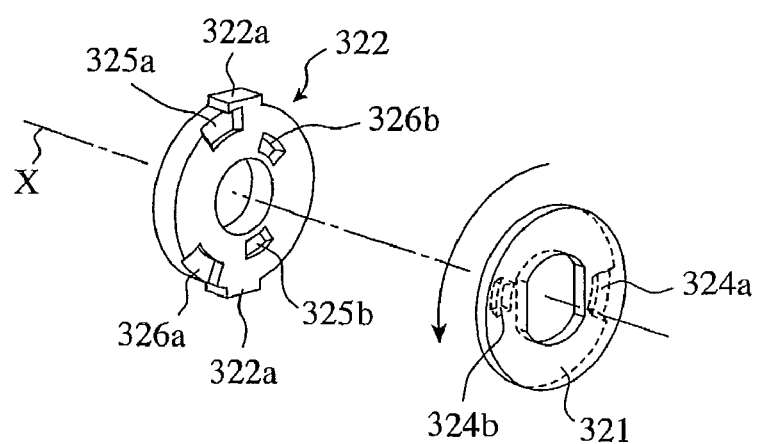

MONITOR HINGE DEVICE

FIELD OF THE INVENTION

The present invention relates to a monitor hinge device that performs opening or closing and positioning of a monitor.

BACKGROUND OF THE INVENTION

In recent years, there has been provided a passenger car in which a monitor for television, DVD, game, etc. is installed for rear-seat occupants. In a vehicle equipped with a 3-row seat, facing-each-other seats, or the like, a monitor is mounted on the ceiling of the vehicle. It is desirable that such a monitor is constructed in such a way that a passenger can change the direction of the screen of the monitor according to the passenger's sitting state, i.e. whether the passenger is facing forwardly or backwardly, or placed in a reclining state or the like. In other words, it is desirable that such a monitor is constructed in such away that a passenger can not only perform opening or closing of the monitor by pulling or pushing the monitor out of or in the ceiling, but also rotate (pivot) the monitor to change its direction. Furthermore, such a demand occurs not only on vehicles but also on equipment equipped with a monitor.

Patent reference 1 discloses, as a hinge device for enabling a monitor to be opened and closed and for enabling the monitor to be pivoted, "a hinge device and electronic equipment using the hinge device" which is adopted by a mobile phone and so on. The hinge device disclosed by patent reference 1 is constructed in such a way that a rotation hinge device is incorporated into a base body arranged in a connecting portion (a pivot portion) for connecting between a first member and a second member, the base body is rotatably connected to the first member by this rotation hinge device, for example, while a pivot hinge device is incorporated along a direction perpendicular to an axis of the above-mentioned rotation of the base body, and the second member is connected to the pivot hinge device. The hinge device disclosed is further constructed in such a way as to include a pivot position holding mechanism for holding a pivot position by using cam engagement for holding the rotational position in a state in which it has been rotated by a predetermined angle.

[Patent reference 1] JP,2003-120652, A

However, because the hinge device disclosed by patent reference 1 has the structure of holding the opening or closing angle of the monitor at a predetermined angle regardless of the angle of the pivot, in a case in which, for example, the angle (the visual recognition angle) at which the monitor is viewed is 120 degrees with respect to the monitor's screen and the holding mechanism is disposed at a position having an angle of 120 degrees, the monitor is held at a position (180-120 degrees) having an angle of 60 degrees with respect to the monitor's screen after the monitor has been pivoted. Therefore, because the holding mechanism works in a state in which the monitor is not open completely and is placed at an angle of 60 degrees if the viewer performs an operation of opening or closing the monitor after the monitor has been pivoted, the user feels displeasure. A further problem is that the monitor cannot be held with the above-mentioned structure when the monitor screen is positioned at an opening and closing position having an angle of 120 degrees with respect to the direction of the front of the monitor after the monitor has been pivoted.

The present invention is made in order to solve the above-mentioned problems, and it is therefore object of the present invention to provide a monitor hinge device that enables a monitor to be opened and closed and that not only enables the monitor to be pivoted and oriented toward a different direction in a state in which the monitor is open, but also can position the monitor at a predetermined position in a state in which the monitor is oriented toward the different direction.

DISCLOSURE OF THE INVENTION

A monitor hinge device in accordance with the present invention enables a monitor to be opened and closed about a first rotation central axis and also enables the above-mentioned monitor which has been rotated about the above-mentioned first rotation central axis in an opening direction to be rotated about a second rotation central axis substantially perpendicular to the above-mentioned first rotation central axis, and the monitor hinge device includes a pair of brackets disposed on a side of the monitor hinge device where the monitor is mounted, a base supported by these brackets in such a way that the base can be rotated about the first rotation central axis, and an elevator base disposed in such a way as to be able to move in a direction of the second rotation central axis with respect to the base, while a monitor shaft whose center is on the second rotation central axis, a guide screw groove being formed in the motor shaft, is disposed on the monitor and the monitor shaft is rotatably attached to the base and is penetrated through the elevator base, and the monitor hinge device further includes a screw mechanism disposed in the elevator base, for being engaged with the guide screw groove of the monitor shaft to move the elevator base in the direction of the second rotation central axis through rotation, and a positioning means disposed between the elevator base and the brackets, a positioning means for positioning the above-mentioned monitor at a position at which the above-mentioned monitor is rotated by a predetermined amount with respect to the above-mentioned first rotation central axis and for positioning the above-mentioned monitor which has been rotated about the above-mentioned second rotation central axis at a position at which the above-mentioned monitor is rotated by a predetermined amount with respect to the above-mentioned first rotation central axis. The monitor hinge device carries out the positioning of the monitor at its rotational position before and after the monitor has been rotated about the second rotation central axis by changing the position which can be positioned by using a cam mechanism or the like.

The monitor hinge device in accordance with the present invention not only can position the monitor at an predetermined angle in the state in which the monitor has been rotated about the first rotation central axis from a state in which the monitor is accommodated, but also enables the monitor to be rotated about the first rotation central axis to position the monitor at a predetermined angle even in the state in which the monitor has been rotated (pivoted) about the second rotation central axis. The monitor hinge device can therefore support users' various use states.

BRIEF DESCRIPTION OF THE FIGURES

FIG. 2 is an exploded perspective view of the monitor hinge device in accordance with Embodiment 1 of the present invention;

FIG. 13(a) is a top plan view, FIG. 13(b) is a side view, and FIG. 13(c) is a bottom view;

FIG. 15(a) is a top plan view, FIG. 15(b) is a side view, and FIG. 15(c) is a bottom view;

FIG. 17 is an enlarged view of a part shown in FIG. 17;

FIG. 19A is a perspective view showing operations of a monitor and a cam mechanism of the monitor hinge device in accordance with Embodiment 5 in a state in which the monitor is accommodated;

PREFERRED EMBODIMENTS OF THE INVENTION

Hereafter, in order to explain this invention in greater detail, the preferred embodiments of the present invention will be described with reference to the accompanying drawings.

Embodiment 1

Figure 3:
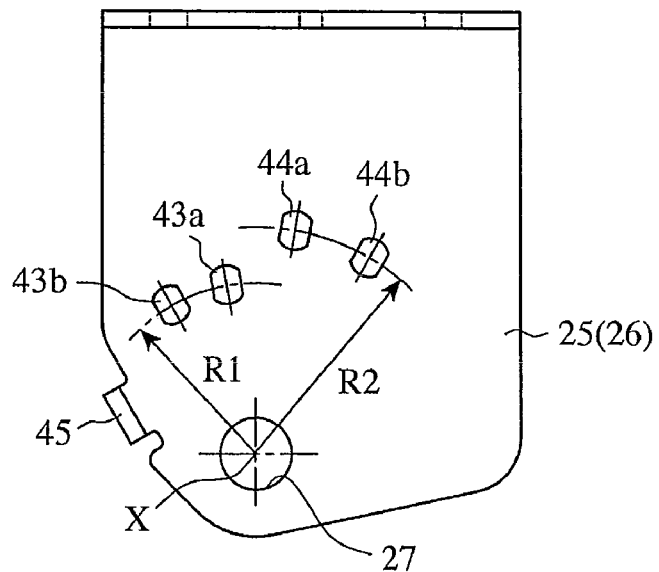
FIG. 3 is an enlarged side view of a bracket in the monitor hinge device in accordance with Embodiment 1.
Figure 4:
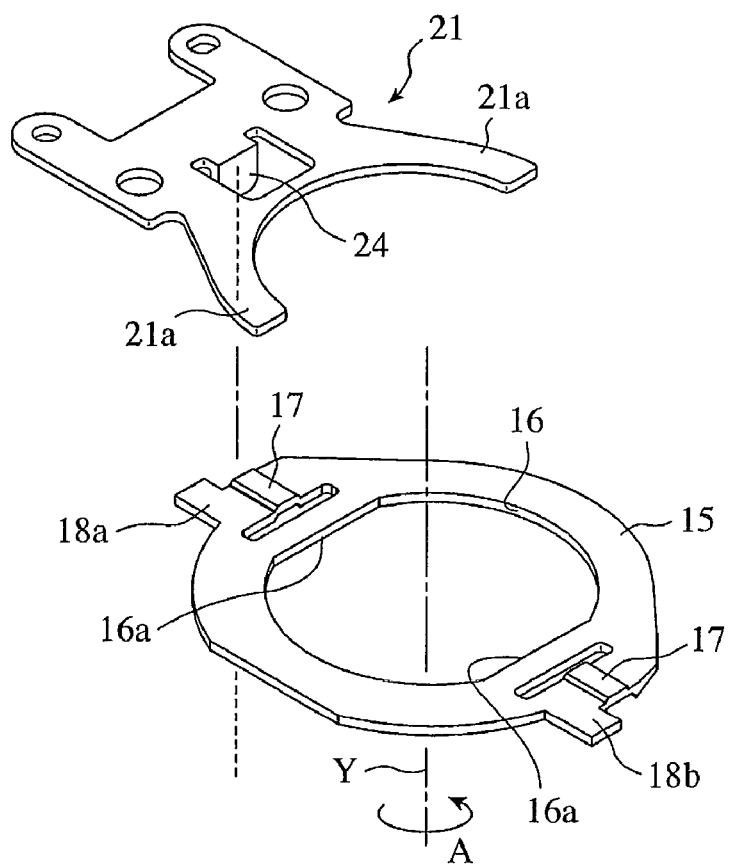
FIG. 4 is a perspective view of a rotation holding plate and an axis holding plate in the monitor hinge device in accordance with Embodiment 1.

In Embodiment 1, a monitor hinge device in accordance with the present invention is applied to a monitor device which is installed in the ceiling surface inside the cabin of a vehicle. FIGS. 1A to 1G are diagrams showing a series of an opening operation, a closing operation, and a pivoting operation of the monitor device equipped with the monitor hinge device in accordance with Embodiment 1, FIG. 2 is an exploded perspective view of the monitor hinge device in accordance with Embodiment 1 which is applied to the monitor device, FIG. 3 is an enlarged view of a bracket of the monitor hinge device, FIG. 4 is an exploded perspective view of a mechanism for restricting the rotational position of the monitor, and FIGS. 5A to 5E are perspective views showing an operation of enabling the monitor to be rotated which is carried out by the monitor hinge device.

Figure 1A:
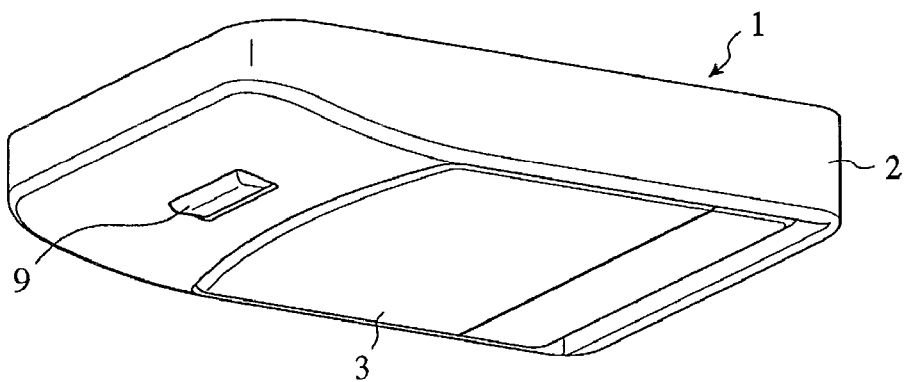
FIG. 1A is a perspective view showing an operation which is performed on a monitor by a monitor hinge device in accordance with Embodiment 1 of the present invention in a state in which the monitor is closed.
Figure 1B:
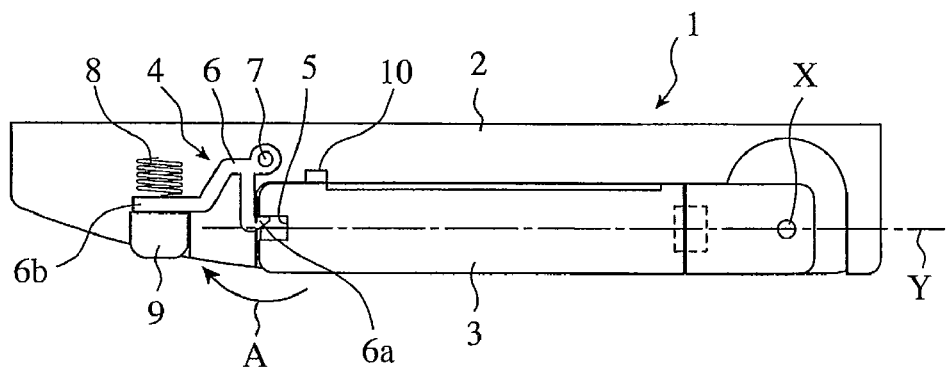
FIG. 1B is an outline cross-sectional view of the state shown in FIG. 1A.
Figure 1C:
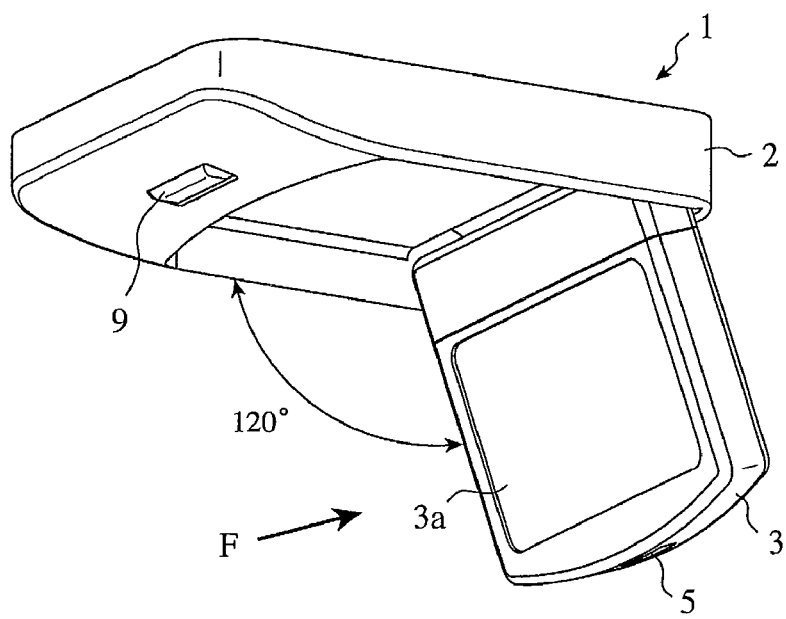
FIG. 1C is a perspective view showing an operation which is performed on the monitor by the monitor hinge device in accordance with Embodiment 1 of the present invention in a state in which the monitor is opened at 120 degrees.
Figure 1D:
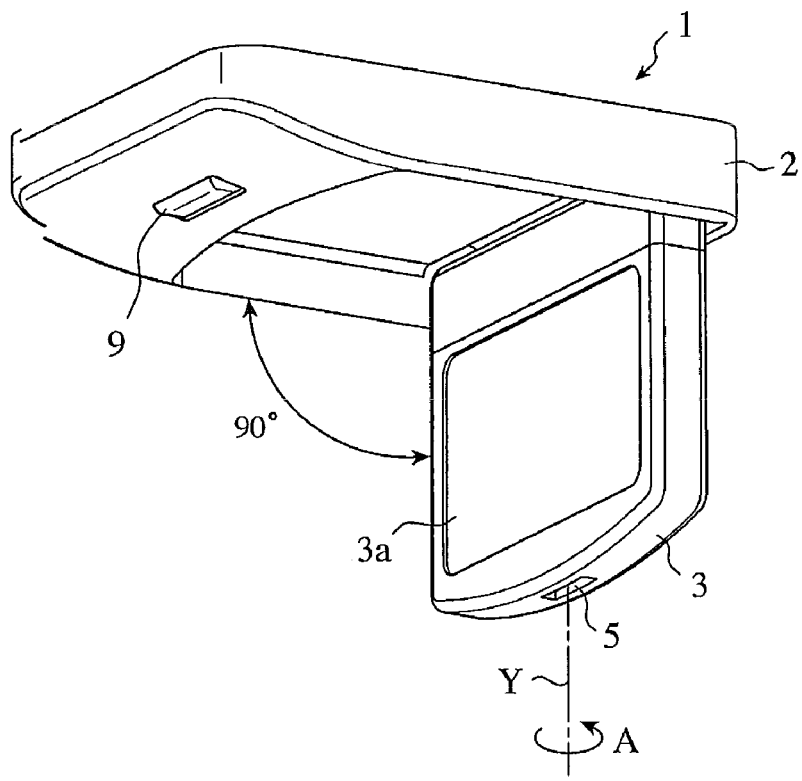
FIG. 1D is a perspective view showing an operation which is performed on the monitor by the monitor hinge device in accordance with Embodiment 1 of the present invention in a state in which the monitor is opened at 90 degrees.
Figure 1E:
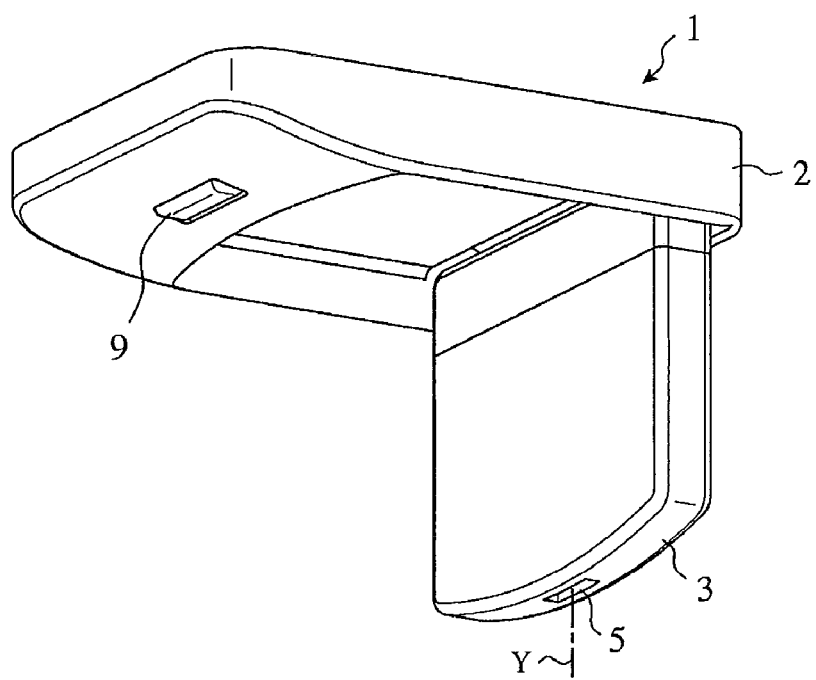
FIG. 1E is a perspective view showing an operation which is performed on the monitor by the monitor hinge device in accordance with Embodiment 1 of the present invention in a state in which the monitor is reversed from the state shown in FIG. 1C.
Figure 1F:
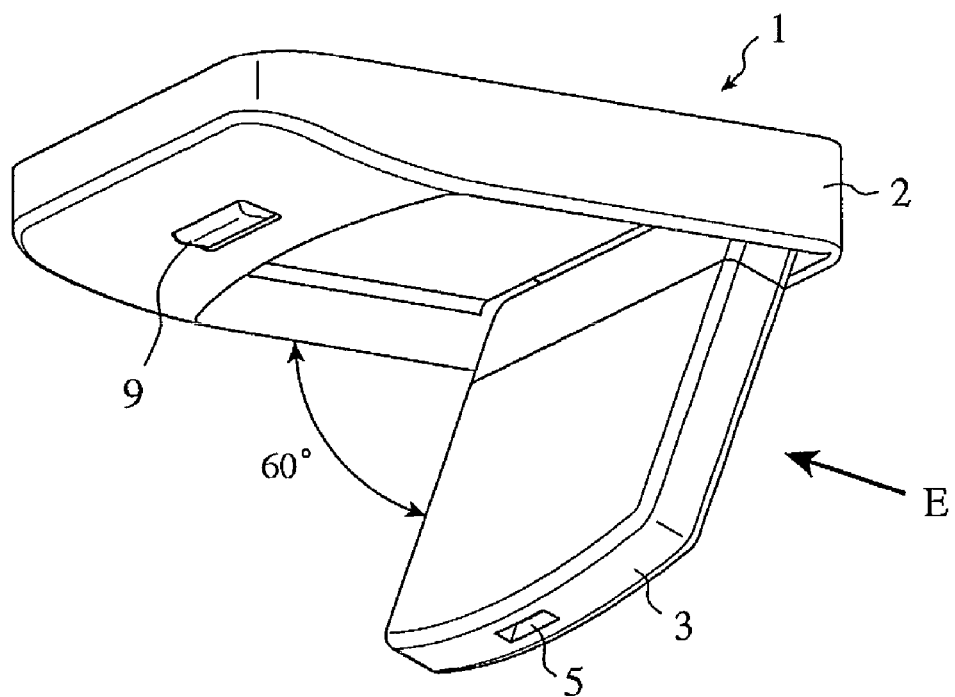
FIG. 1F is a perspective view showing an operation which is performed on the monitor by the monitor hinge device in accordance with Embodiment 1 of the present invention in a state in which the monitor is reversed from the state shown in FIG. 1C.
Figure 1G:
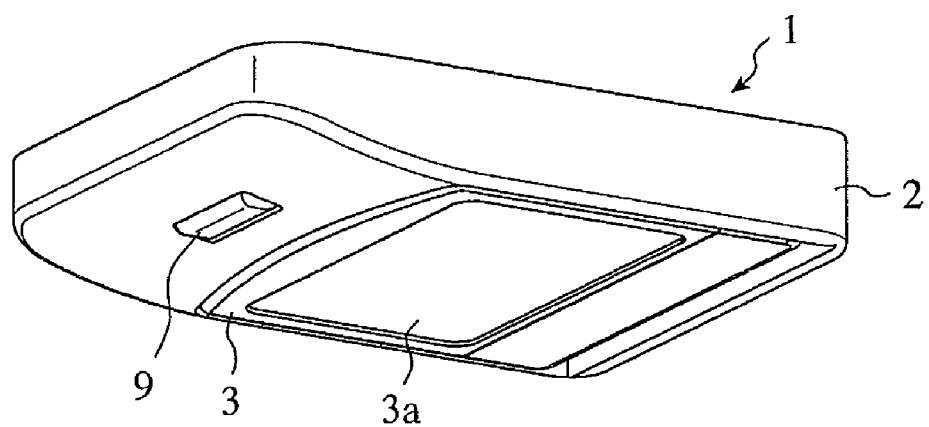
FIG. 1G is a perspective view showing an operation which is performed on the monitor by the monitor hinge device in accordance with Embodiment 1 of the present invention in a state in which the monitor is accommodated.

As shown in FIGS. 1A to 1G, the monitor device 1 is comprised of a monitor accommodation case 2 which is a monitor accommodating unit disposed in the ceiling surface (on a side on which the monitor is attached) of the vehicle, and a monitor 3 which can be rotated (opened and closed) with respect to this monitor accommodation case 2 so that the monitor 3 can be pushed into or pulled out of the monitor accommodation case 2. A screen 3a is formed in one surface of the monitor 3. The monitor 3 can be rotated about a first rotation central axis (abbreviated as a "first axis" from here on) X set in an end portion (a base end portion) thereof in such a way as to be opened with respect to the monitor accommodation case 2, as shown in, for example, FIG. 1C. The monitor 3 can be rotated, by 180 degrees, about a second rotation central axis (abbreviated as a "second axis" from here on) Y which is perpendicular to the first axis X and is parallel to the screen 3a of the monitor 3 in a state, as shown in FIG. 1D, in which the monitor 3 is opened at an angle of 90 degrees with respect to the monitor accommodation case 2, so that the monitor 3 is oriented toward the opposite direction as shown in FIG. 1E. In addition, also in the state in which the monitor is oriented toward the opposite direction, the monitor 3 can be accommodated into the monitor accommodation case 2, as shown in FIG. 1G. In subsequent explanation, a state in which the monitor 3 has not been rotated about the second axis Y yet regardless of its angle with respect to the first axis X (i.e. a state as shown in either of FIGS. 1A to 1D) is referred to as a normal state, and a state in which the monitor 3 has been rotated, by 180 degrees, about the second axis Y and is oriented toward the opposite direction regardless of its angle with respect to the first axis X (i.e. a state as shown in either of FIGS. 1E to 1G) is referred to as a reversed state or a state of having been reversed.

Between the other end portion (the leading end portion) of the monitor 3 and the monitor accommodation case 2, a locking mechanism 4 for locking or unlocking the monitor 3 to or from the monitor accommodation case 2 is disposed. A locking hole 5 is formed in a central part of an end surface of the monitor 3 on the side of the leading end portion of the monitor 3 as a locking member of the locking mechanism 4. The locking hole 5 is disposed on the second axis Y which is perpendicular to the first axis X and which passes through both the center of the monitor 3 with respect to the direction of the width of the monitor 3 and the center of the monitor 3 with respect to the direction of the thickness of the monitor 3, as shown in FIG. 1B. A locking pawl member 6 having a claw portion 6a which can be engaged with and detached from the locking hole 5 is disposed, as another locking member of the locking mechanism, in the monitor accommodation case 2 in such a way that the locking pawl member can be rotated about an axis 7. An operation unit 6b is disposed on a side opposite to the side of the claw portion 6a with respect to the axis 7 of the locking member 6, and a spring force for pushing the claw portion 6a into the locking hole 5 is exerted on this operation unit 6b by a spring 8. A button 9 is disposed on another side of the operation unit 6b opposite to the side facing the spring 8, and this button 9 is exposed from a surface of the monitor accommodation case 2. When the button 9 is pushed down, the locking pawl member 6 pivots and the claw portion 6a goes out of the locking hole 5 and the monitor 3 is opened downwardly with respect to the first axis X. Furthermore, when the monitor 3 is pushed into the monitor accommodation case 2, the monitor 3 resists the spring force of the spring 8 and goes into the monitor accommodation case 2 while pushing the claw portion 6a in, and, when the locking hole 5 reaches the position of the claw portion 6a, the claw portion 6a goes into the locking hole 5 and the monitor 3 is then locked. The leading end of the claw portion 6a is slanted in such a way that the claw portion 6a can be pushed in by the monitor 3 and the locking pawl member can pivot easily.

A rubber cushion 10 is disposed in a portion, within the monitor accommodation case 2, with which each of surfaces of the monitor 3 (a part of a front surface, except the screen 3a, in which the screen 3a is disposed, and a rear surface 3b) is brought into contact. When the monitor 3 is accommodated into the case, the surface of the monitor 3 is brought into contact with the rubber cushion 10 or they stay away from each other at a fixed distance between them. The rubber cushion 10 serves as a buffer at the time when the monitor 3 is pushed into the monitor accommodation case 2 in order to accommodate the monitor into the monitor accommodation case, and also prevents occurrence of an unusual sound due to vibrations of the monitor 3 in the state in which the monitor is accommodated into the monitor accommodation case and prevents the monitor 3 from being scratched.

Explaining an example of movements of this monitor device 1 with reference to FIGS. 1A to 1G, FIGS. 1A and 1B show a state in which the monitor 3 is accommodated into the monitor accommodation case 2, and, when the button 9 is pushed down in this state, the claw portion 6a of the locking pawl member 6 is detached from the locking hole 5, and the monitor 3 is rotated about the first axis X and is then opened. FIG. 1C shows a state in which the opened monitor 3 has been further rotated and is positioned up to a position at which the screen 3a provides suitable visual recognition (viewing and listening) from a direction F (i.e. a position at which the monitor has been rotated by 120 degrees from the closed state). The position suitable for visual recognition can be selected from among some positions according to a passenger sitting state or the like. FIG. 1D shows a state in which the monitor 3 has been rotated by 90 degrees with respect to the closed position. With this state being defined as a reference position (a rotation reference position), the monitor 3 can be further rotated (pivoted) about the second axis Y. A state in which the monitor 3 has been pivoted by 180 degrees with respect to the state of FIG. 1D is shown in FIG. 1E. The monitor 3 in the reversed state can be rotated about the first axis X so that the monitor 3 can be positioned at a predetermined visibility position. FIG. 1F shows a state in which the monitor has been rotated, by a predetermined angle (i.e. 60 degrees with respect to the closed state), from the reversed state as shown in FIG. 1E and is then positioned at a position suitable for visual recognition from a direction B. That is, it is a state in which the position of the screen 3a has been changed from the visibility position (FIG. 1C) suitable for, for example, a passenger facing forward inside the cabin of the vehicle to a visibility position for a passenger facing backward. In addition, FIG. 1G shows a state in which the monitor 3 in the state of having been reversed is accommodated into the monitor accommodation case 2 with being placed in that state. In this state, the screen 3a is fitted in the ceiling surface. For example, in this state, a passenger is easy to visually recognize the screen when the passenger sets his or her seat in a reclining state.

Next, the monitor hinge device 11 which implements the above-mentioned operation of enabling the monitor 3 to be rotated about the first axis X and the above-mentioned operation of enabling the monitor 3 to be rotated about the second axis Y will be explained with reference to the exploded perspective view of FIG. 2. A state in which the monitor hinge device is assembled will be explained with reference to FIGS. 5A to 5E showing an operation of the monitor hinge device 11.

The monitor 3 is formed in a flat rectangular parallelepiped shape, and the screen 3a is disposed in one surface of the monitor as mentioned above. A cylindrical monitor shaft 12 whose the central axis is aligned with the second axis Y is disposed in a central part of an upper surface 3c of the monitor 3. A ring-shaped monitor shaft groove 13 is formed in the outer surface of the monitor shaft 12 in the vicinity of the root of the monitor shaft 12, and a spiral guide screw groove 14 is formed in the outer surface of the monitor shaft 12 in an upper portion of the monitor shaft 12.

A ring-shaped rotational position holding plate 15 is integrally fitted to a root portion of the monitor shaft 12 which is located below the monitor shaft groove 13. Two flat surface portions 12a (only one surface portion is shown in FIG. 2) are formed in the outer surface of the root portion of the monitor shaft 12. As shown in FIG. 4, straight portions 16a are formed in the inner surface 16 of the rotational position holding plate 15, and the straight portions 16a are fitted to the flat surface portions 12a in such a way that the rotational position holding plate 15 is integral with the monitor shaft 12.

Two rotational position holding projections 17 for holding the rotational position of the monitor 3 with engagement with a base which will be mentioned below are disposed in a surface of the rotational position holding plate 15 in such a way as to extend along a direction of the diameter of the rotational position holding plate. Contact parts 18a and 18b for restricting the rotation of the monitor 3 by coming into contact with a stopper disposed on the base which will be mentioned below are disposed in the outer surface of the rotational position holding plate 15 in such a way as to project along a direction of the diameter of the rotational position holding plate. These contact parts 18a and 18b are disposed at their respective positions slightly deviated from the rotational position holding projections 17 with respect to a circumferential direction.

The long and slender plate-shaped base 19 is placed on the rotational position holding plate 15 fixed to the monitor shaft 12. A hole 20 is formed in a central part of the base 19, and the monitor shaft 12 is passed through this hole 20. In the state shown in FIG. 2, shaft holding plates 21 and 22 are attached onto an upper surface of the base 19 in such a way as to face the hole 20. The shaft holding plates 21 and 22 have semicircular arc-shaped holding parts 21a and 22a respectively, and these holding parts 21a and 22a are fitted into the monitor shaft groove 13 of the monitor shaft 12 in such a way that the shaft holding plates 21 and 22 sandwich the monitor shaft 12 between them from the both sides of the monitor shaft. Because the monitor shaft 12 is held by the shaft holding plates in this way, the monitor shaft 12 can be rotated with respect to the base 19, but cannot be moved in a direction of its axis.

Rotation holding grooves 23 with which the rotational position holding projections 17 disposed on the surface of the above-mentioned rotational position holding plate 15 can be engaged are formed in the base 19. When the monitor 3 is rotated about the second axis Y and the rotational position holding projections 17 are then engaged with the rotation holding grooves 23 of the base 19, the monitor 3 is positioned at a predetermined position with respect to the base 19.

A rotary stopper 24 which is formed to project downwardly as shown in FIG. 4 is disposed in the shaft holding plate 21, and this rotary stopper 24 is penetrated through one rotation holding groove 23 of the base 19 and extends along the peripheral surface of the rotational position holding plate 15 disposed on the side of the monitor shaft 12. Therefore, when the monitor 3 is rotated with respect to the base 19, the rotational position holding projections 17 are engaged with the rotation holding grooves 23 of the base 19, as mentioned above, and, as a result, the rotational position holding projections are positioned with a feeling of detents, while even if the monitor is going to be further rotated, the rotary stopper 24 is brought into contact with the contact portion 18a or 18b and hence the monitor is prevented from being further rotated.

On the side of the ceiling surface of the vehicle (i.e. in the monitor accommodation case 2), a pair of brackets 25 and 26 are disposed at a predetermined spacing. A base support hole 27 whose center is on the first axis X is formed in each of these brackets 25 and 26. On the other hand, the both ends of the base 19 are formed into axis mounting members 19a which are bent upwardly, and monitor opening and closing axes 28 are respectively disposed in these axial mounting members 19a in such a way that the monitor opening and closing axes 28 are running in a straight line. Each of the monitor opening and closing axes 28 has a leading end portion which is a flat spring mounting member 29 on which flat surfaces are formed (i.e. the flat spring mounting member is D-cut). The monitor opening and closing axes 28 are respectively penetrated through the base support holes 27 of the brackets 25 and 26. The flat spring mounting members 29 of the monitor opening and closing axes 28 respectively projecting from the brackets 25 and 26 are respectively passed through slide plate springs 31 each having a hole 30 having the same cross-sectional shape as that of the flat spring mounting members 29 so that the slide plate springs 31 are respectively attached to the flat spring mounting members. Engagement projections 32 are respectively disposed in the surfaces of the slide plate springs 31 on the side of the brackets 25 and 26, and these engagement projections 32 are respectively forced flexibly against the brackets 25 and 26 by the spring elastic forces of the slide plate springs 31. Therefore, since the monitor 3 can be rotated about the first axis X with respect to the brackets 25 and 26 by means of the monitor opening and closing axes 28, and the slide plate springs 31 are respectively forced flexibly against the brackets 25 and 26 via the engagement projections 32, the monitor 3 can be rotated with a moderate sliding resistance. In this Embodiment 1, the slide plate springs 31 serve as a sliding mechanism of producing the sliding resistance. Although not illustrated, the slide plate springs 31 are respectively forced against the brackets 25 and 26 by tightening a nut to each of the flat spring mounting members 29 or caulking each of the flat spring mounting members 29.

Two guide pins 33 are stood on the base 19, and an elevator base 35 is disposed movably along with the guide pins 33 by making these guide pins 33 pass through guide holes 34 formed in the elevator base. The elevator base 35 is shaped into a long slender plate, a circular boss 36 whose center is aligned with the second axis Y is disposed in a central part of the elevator base, and the monitor shaft 12 is penetrated through the boss 36. A ring-shaped adjusting plate 37 is attached to an upper surface of the elevator base 35. A hole 38 through which the monitor shaft 12 is penetrated is disposed in a central part of the adjusting plate 37, and screw engaging pins 39 which face each other and extend in a direction of the diameter of the hole are disposed in an edge portion of the adjusting plate surrounding the hole. These screw engaging pins 39 are engaged with the guide screw groove 14 of the monitor shaft 12. Therefore, when the monitor 3 is rotated about the second axis Y, the screw engaging pins 39 are moved via the engagement with the guide screw groove 14, and, as a result, the elevator base 35 is moved (moved up or down) along with the adjusting plate 37 in a direction of the second axis Y.

The attachment of the adjusting plate 37 to the elevator base 35 is done by passing screws 40a through oblong holes 40 formed in the adjusting plate 37 to fasten them to the elevator base 35. Therefore, the position of the adjusting plate 37 can be adjusted by the length of the oblong holes 40 in a direction of rotation of the adjusting plate.

The both ends of the elevator base 35 are bent upwardly in such a way that locking flat spring parts 41 are formed. Because each of the locking flat spring parts 41 is a part of the elevator base 35 made of a metal, such as a steel plate, the locking flat spring parts have elasticity which the metal has. An engagement projection 42 projecting outwardly is formed on each of these locking flat spring parts 41.

On the other hand, as shown in FIG. 3, engaging holes 43a and 43b, and engaging holes 44a and 44b are respectively formed on circumferences of circles having different radiuses (a radius R1 and a radius R2) whose centers are at the center of the base support hole 27 (i.e. the first axis X) formed in each of the brackets 25 and 26. A position on the radius R1 corresponds to each of the engagement projections 42 of the elevator base 35 at the time when the monitor 3 is placed in the normal state, and a position on the radius R2 corresponds to each of the engagement projection 42 of the elevator base 35 at the time when the monitor 3 is placed in the reversed state in which the monitor 3 has been pivoted about the second axis Y. That is, (R2−R1) is equal to the amount of travel of the elevator base 35. Each of these engaging holes 43a, 43b, 44a, and 44b is disposed for positioning the monitor 3 at a predetermined visibility position in the normal state or in the reversed state, and the angles of the engaging holes with respect to the vertical direction are determined properly. In this Embodiment 1, the engaging holes 43a and 44a are arranged at positions having an angle of 30 degrees, and the engaging holes 43b and 44b are arranged at positions having an angle of 60 degrees. The engaging holes 43a, 43b, 44a, and 44b can be recesses or penetrating holes. In this Embodiment 1, the engagement projections 42 and the engaging holes 43a, 43b, 44a, and 44b construct a positioning means. A stopper 45 is formed in an edge portion of each of the brackets 25 and 26 on a side of the engaging holes 43a and 43b. This stopper 45 is brought into contact with the slide plate spring 31 attached to the end portion of the monitor opening and closing axis 28 to prevent the monitor 3 from being rotated by over a predetermined amount of rotation.

Next, an operation of positioning the monitor 3 which is carried out by the monitor hinge device in accordance with this Embodiment 1 will be explained with reference to FIGS. 5A to 5E.

Figure 5A:
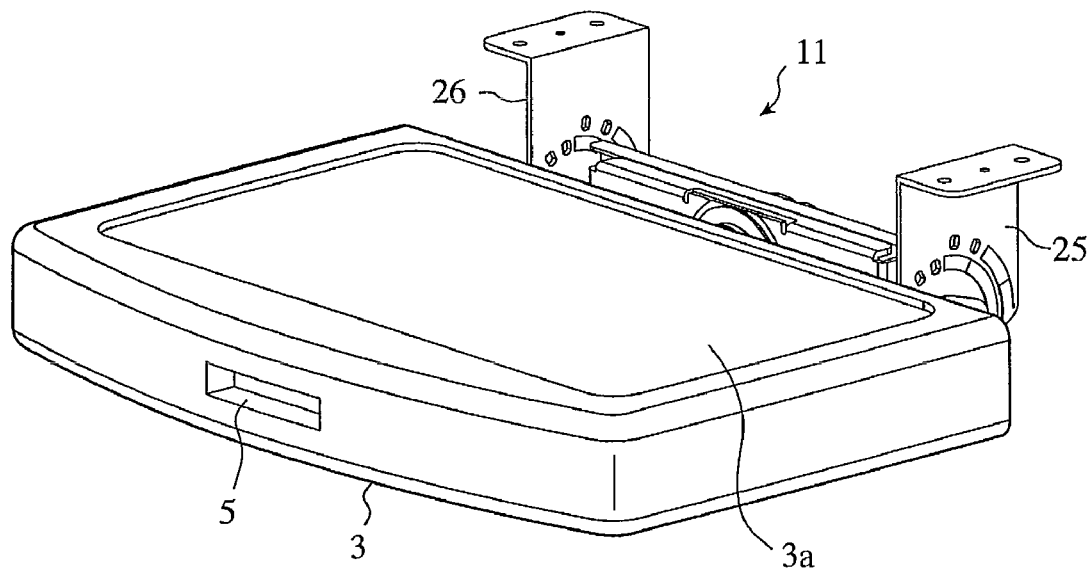
FIG. 5A is a perspective view showing an operating state of the monitor hinge device in accordance with Embodiment 1 in a state in which the monitor is accommodated.
Figure 5B:
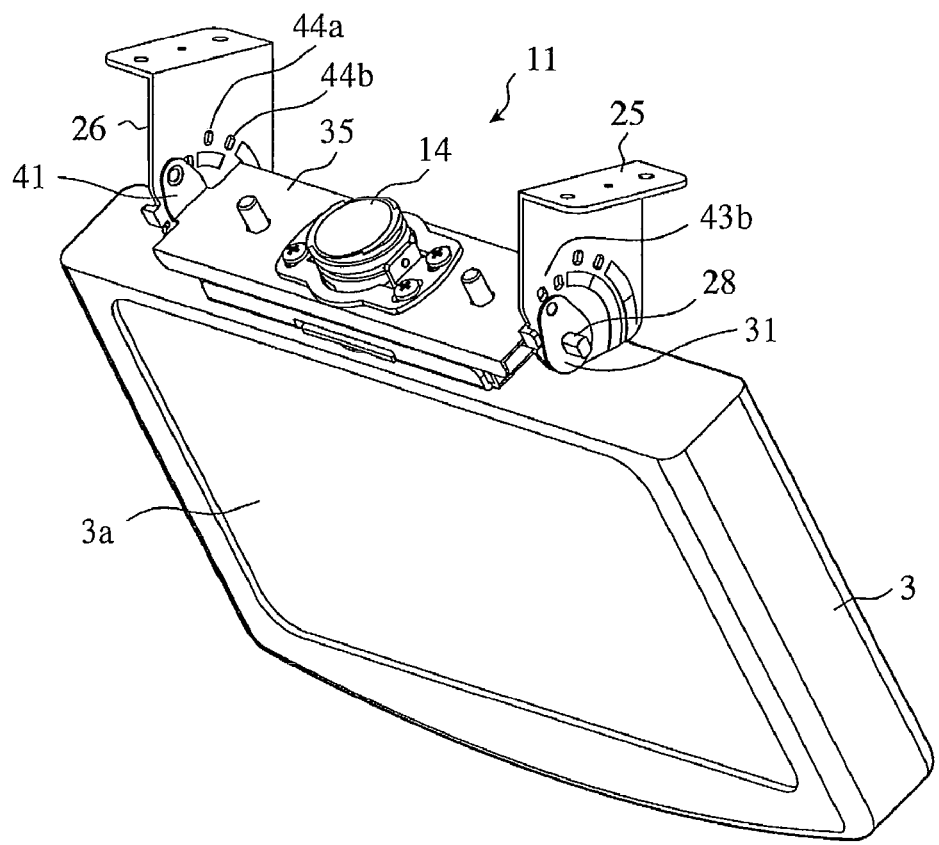
FIG. 5B is a perspective view showing an operating state of the monitor hinge device in accordance with Embodiment 1 in a state in which the monitor is opened and positioned.

FIG. 5A shows a monitor hinge state in which the monitor 3 is accommodated into the monitor accommodation case 2 (refer to FIGS. 1A and 1B). When the button 9 is pushed in this state, the claw portion 6a is detached from the locking hole 5 disposed on the side of the monitor 3, so that the monitor 3 can be downwardly rotated about the monitor opening and closing axis 28 which is the first axis X. FIG. 5B shows a state in which the monitor 3 has been pulled out of the monitor accommodation case and has been rotated, and is then positioned at a position at which a passenger can easily view the monitor 3. In the state as shown in FIG. 5B, the monitor has been rotated by 120 degrees from the state in which the monitor is closed, like in the case of FIG. 1C. That is, in this state, the engagement projections 42 of the locking flat spring parts 41 of the elevator base 35 are respectively engaged with the engaging holes 43b of the brackets 25 and 26, so that the elevator base is positioned. Because the projections 32 of the slide plate springs 31 attached to the end portions of the monitor opening and closing axes 28 are respectively forced flexibly against the brackets 25 and 26, a moderate sliding resistance occurs when the monitor 3 is rotated. From the viewpoint of a torque, a moderate torque is needed in order to rotate the monitor 3. When the engagement projections 42 which are respectively forced flexibly against the brackets 25 and 26 are fitted into the engaging holes 43a or 43b, a feeling of detents is produced. That is, a feeling that the monitor is positioned at a positioning place is produced.

Figure 5C:
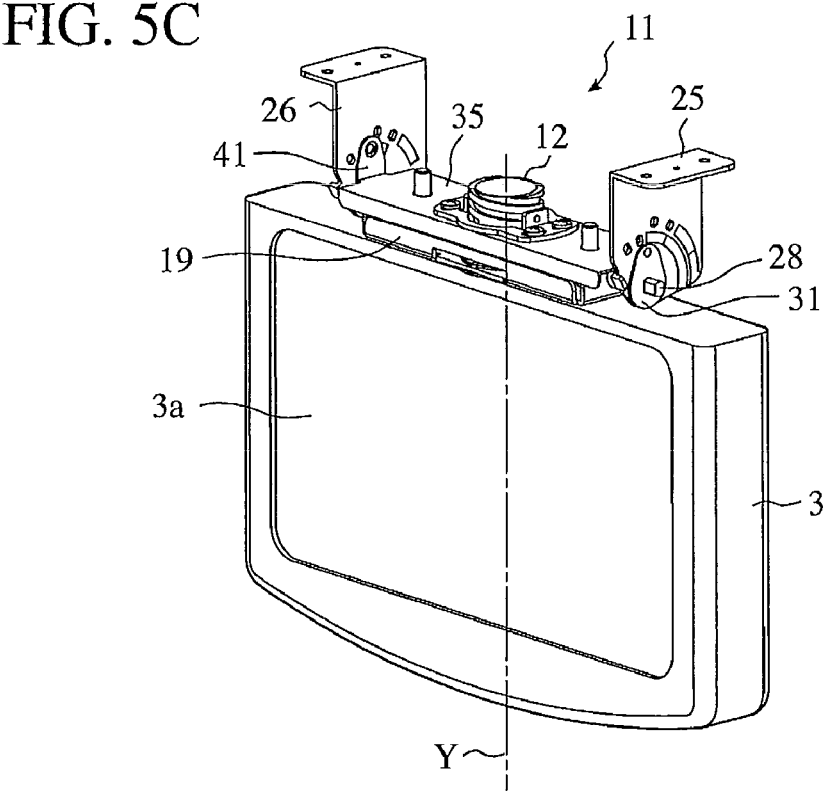
FIG. 5C is a perspective view showing an operating state of the monitor hinge device in accordance with Embodiment 1 in a state in which the monitor has been rotated by 90 degrees with respect to its closed position.
Figure 5D:
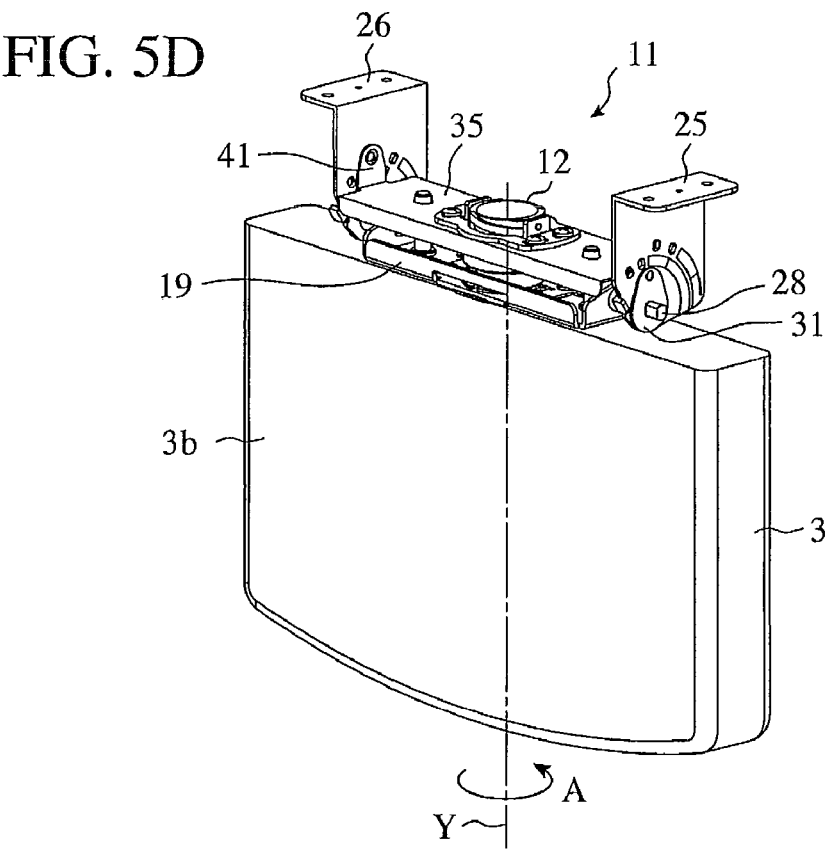
FIG. 5D is a perspective view showing an operating state of the monitor hinge device in accordance with Embodiment 1 in a state in which the monitor is reversed from the state shown in FIG. 5C.

In order to reverse the monitor 3, the monitor 3 is moved to the rotation reference position first, as shown in FIG. 5C. When the monitor 3 is pivoted (i.e. the monitor is rotated about the second axis Y) in this state, the screw engaging pins 39 engaged with the guide screw groove 14 of the monitor shaft 12 which is rotated is pushed upwardly, and therefore the elevator base 35 moves up. A state in which the monitor 3 has been reversed (pivoted) by 180 degrees is shown in FIG. 5D. When the monitor 3 is pivoted by 180 degrees, the rotational position holding projections 17 of the rotational position holding plate 15 disposed on the side of the monitor 3 are fitted into the rotation holding grooves 23 formed on the side of the base 19. Because a passenger who is performing an operation of rotating the monitor 3 can feel the fitting of the rotational position holding projections 17 into the rotation holding grooves 23, he or she can certainly operate the monitor 3 to place this monitor at a position at which the monitor is reversed by 180 degrees. As can be seen from FIGS. 5C and 5D, as the monitor 3 is reversed and the elevator base 35 moves up, each of the engagement projections 42 moves from a position on the circumference (the radius R1) on which the engaging holes 43a and 43b are formed to a position on the circumference (the radius R2) on which the engaging holes 44a and 44b are formed.

Figure 5E:
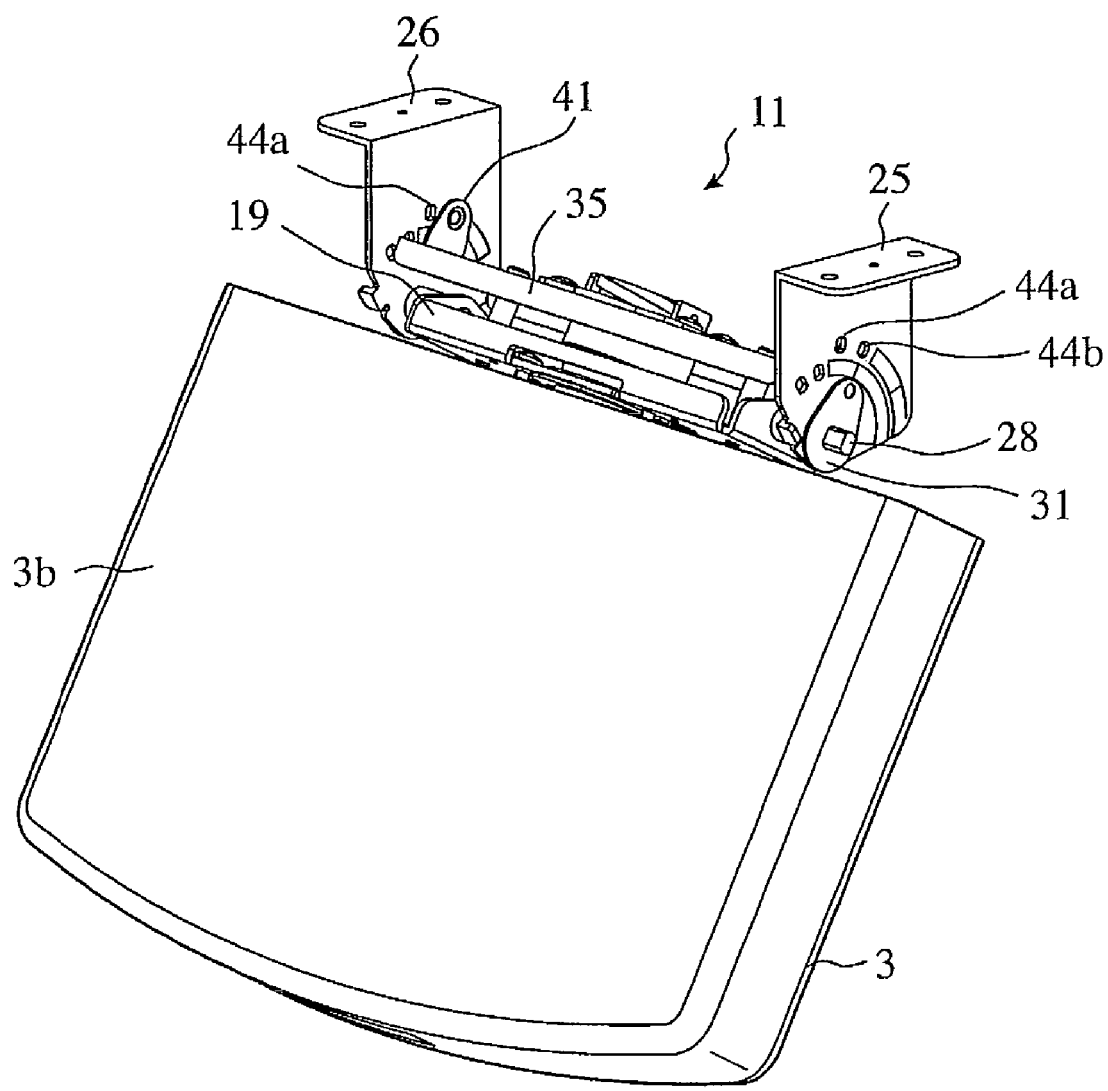
FIG. 5E is a perspective view showing an operating state of the monitor hinge device in accordance with Embodiment 1 in a state in which the monitor in the reversed state has been rotated and is positioned.

In this state, by rotating the monitor 3 about the first axis X, the passenger can position the screen 3a at a position at which the passenger can easily view the screen. When the monitor 3 is rotated, each of the engagement projections 42 of the elevator base 35 is moved along the circumference of the circle having the radius R2. When each of the engagement projections 42 is then fitted into the engaging hole 44a or 44b, the monitor is positioned. FIG. 5E shows a state in which the engagement projections 42 are fitted into the engaging holes 44b, i.e. a positioned state in which the monitor is fixed at a position at which the monitor has been rotated by 30 degrees with respect to the vertical direction.

As mentioned above, by further rotating the monitor 3 about the first axis X in the state, as shown in FIG. 5D or 5E, in which the monitor is reversed, the monitor 3 can be accommodated into the monitor accommodation case 2 in a state in which the screen 3a is oriented downwardly, as shown in FIG. 1G. As a result, the passenger can easily view the screen of the monitor while being in, for example, the reclining state, as mentioned above.

In this Embodiment 1, the positioning position in the normal state has the same angle as that in the reversed state (they have 120 degrees or 150 degrees with respect to the closed position), the positioning angles in the normal state and in the reversed state do not have to be the same as each other and they can be set up independently.

The monitor hinge device 11 in accordance with this Embodiment 1 can position the monitor 3 at a predetermined angle not only in the normal state but also in the reversed state, and can also accommodate the monitor 3 into the monitor accommodation case 2 even in the reversed state in which the monitor is oriented toward the opposite direction. Therefore, the monitor hinge device in accordance with this Embodiment 1 provides very good user-friendliness for the user. Because the engagement projections 42 are engaged with the engaging holes 43a, 43b, 44a, or 44b so that the monitor is positioned, the positioned state of the monitor can be maintained even if a vibration or the like occurs. Furthermore, because the slide plate springs 31 which are made to slide and are respectively brought into contact with the brackets 25 and 26 at the time when the monitor 3 is rotated are used, a moderate resistance can be produced at the time when the user performs an operation of rotating the monitor 3. In addition, because the state of the engagement between the guide screw groove 14, which constructs the cam mechanism, and the screw engaging pins 39 can be adjusted by changing the position of the adjusting plate 37, the engagement between the engaging holes 43a or 43b, or 44a or 44b and the engagement projections 42 of the locking flat spring parts 41 can be adjusted in such a way as to be secured, and therefore influences caused by variations in manufacturing and so on can be absorbed.

Embodiment 2

Figure 6:
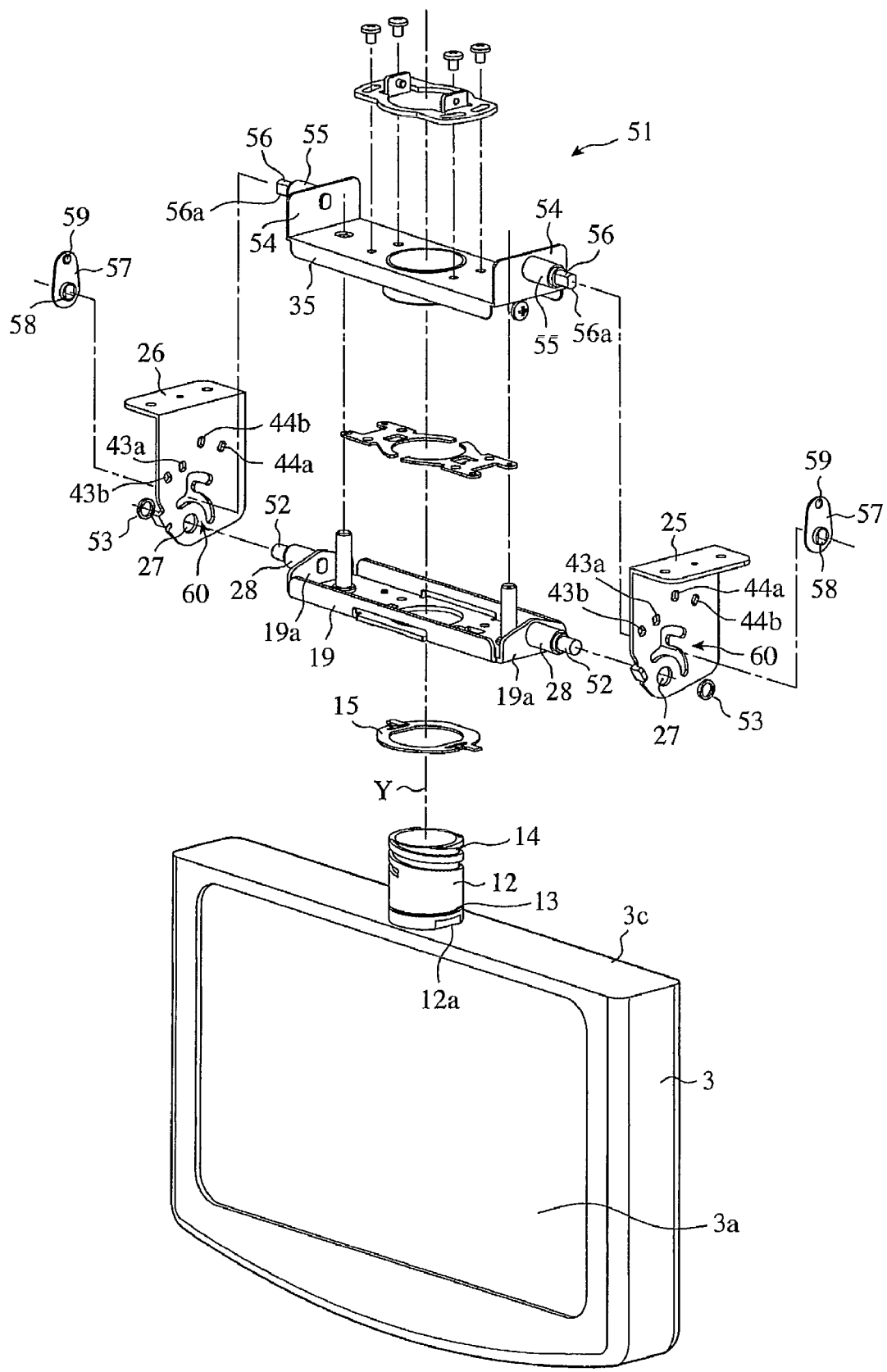
FIG. 6 is an exploded perspective view of a monitor hinge device in accordance with Embodiment 2.
Figure 7:
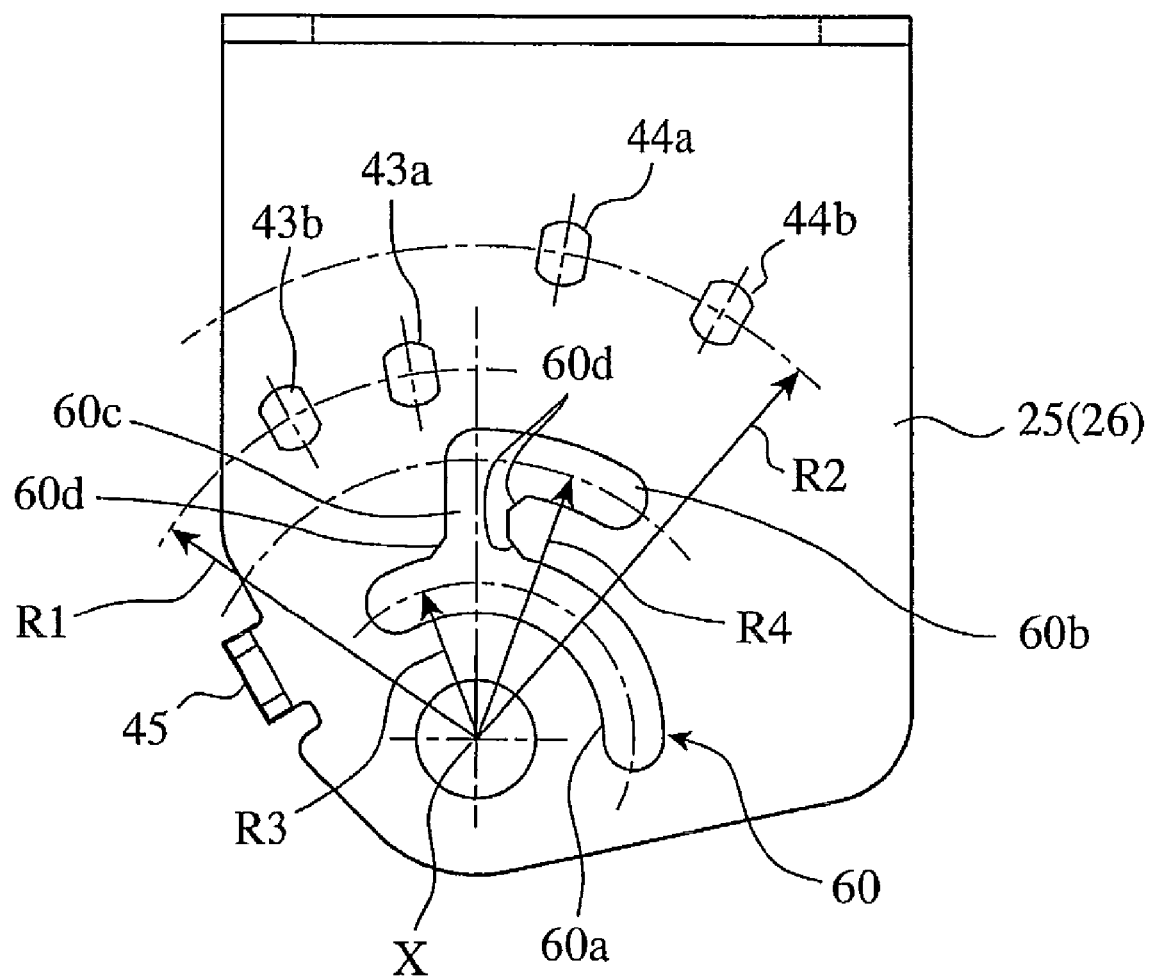
FIG. 7 is an enlarged side view of a bracket in the monitor hinge device in accordance with Embodiment 2.
Figure 8:
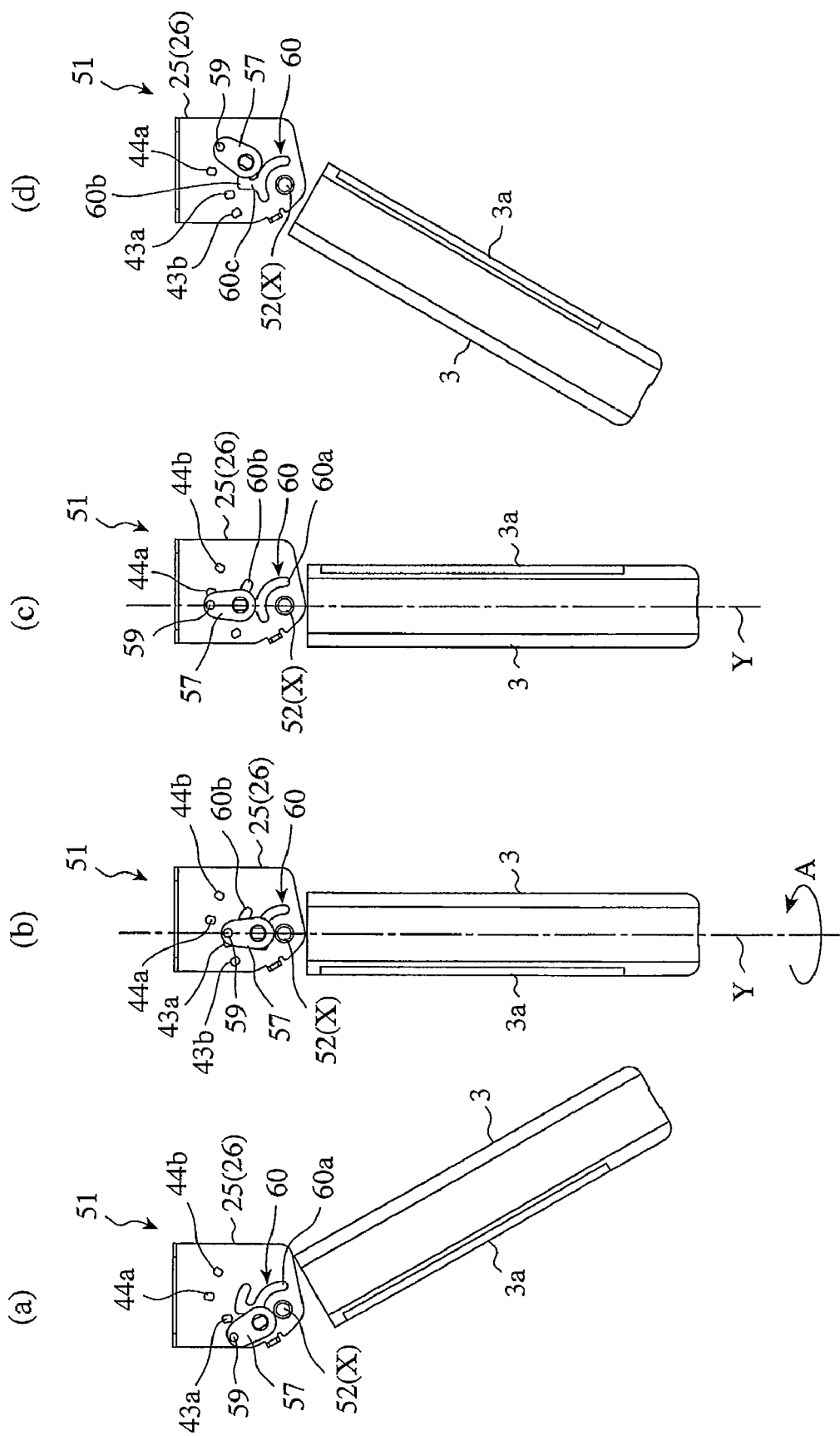
FIG. 8 is a side view showing an operation of the monitor hinge device in accordance with Embodiment 2.

A monitor hinge device in accordance with Embodiment 2 will be explained in detail with reference to drawings. FIG. 6 is an exploded perspective view of the monitor hinge device in accordance with Embodiment 2, FIG. 7 is an enlarged view of a bracket of the monitor hinge device, and FIG. 8 is a side view showing an operation of enabling a monitor to be rotated which is carried out by the monitor hinge device. In the following explanation, the explanation about the same components as those in accordance with Embodiment 1 shown in FIGS. 1 to 5 will be omitted hereafter with the components being designated by the same reference numerals as those shown in the figures.

An axis portion 52 is disposed at a leading end of each of monitor opening and closing axes 28 attached to axis mounting members 19a formed at the both ends of a base 19 of the monitor hinge device 51. These axis portions 52 are respectively passed through base support holes 27 of brackets 25 and 26, and projecting portions of the axis portions respectively projecting from the brackets 25 and 26 are respectively stopped by crimping stops 53. That is, unlike in the case of Embodiment 1, slide plate springs 31 are not attached onto the monitor opening and closing axes 28.

The both ends of an elevator base 35 are bent in such a way that axial mounting members 54 are formed, and an axis 55 for flat spring is attached to each of the axial mounting members. Flat surfaces 56a are formed on a leading end portion of the axis 55 for flat spring in such a way that the leading end portion of the axis 55 is formed as a flat spring mounting member 56 whose cross section is approximately shaped like a letter I. Then, slide plate springs 57 are respectively attached to the flat spring mounting members 56 from outside the brackets 25 and 26. A boss portion 58 having a hole which is approximately shaped like a letter I is disposed in each of the slide plate springs 57 and the corresponding flat spring mounting member 56 is fitted into the hole, which is approximately shaped like a letter I, of the boss portion 58, so that the slide plate springs 57 can be respectively integral with the axes 55 for flat spring with respect to a direction of rotation. An engagement projection 59 which can be engaged with one of engaging holes 43a, 43b, 44a, and 44b formed in each of the brackets 25 and 26 is disposed on each of the slide plate springs 57.

A flat spring sliding guide groove 60 into which the boss portion 58 of each of the slide plate springs 57 is slidably fitted in such a way that movements of each of the slide plate springs 57 are guided is disposed in each of the brackets 25 and 26. The flat spring sliding guide groove 60 has a circular inner side guide portion 60a which makes the distance from the center (i.e. a first axis X) of the monitor opening and closing axis 28 to the center of the axis 55 for flat spring at the time when the monitor 3 is placed in a normal state equal to a radius (R3) and a circular outer side guide portion 60a which makes the distance from the center (i.e. the first axis X) of the monitor opening and closing axis 28 to the center of the axis 55 for flat spring at the time when the monitor 3 is placed in a reversed state equal to another radius (R4). Furthermore, the flat spring sliding guide groove 60 includes a straight line guide portion 60c for connecting the inner side guide portion 60a and the outer side guide portion 60b to each other along the vertical direction.

When the monitor 3 is rotated about the first axis X while being placed in the normal state, the boss parts 58 of the slide plate springs 57 are respectively moved along the inner side guide parts 60a of the flat spring sliding guide grooves 60. That is, each of the inner side guide parts 60a has a length which can cover from an accommodated position as shown in FIG. 1A to a position (i.e. a position at which the monitor is opened at the largest angle) at which the engagement projections 59 of the slide plate springs 57 can be engaged with the engaging holes 43b. The straight line guide portions 60c serve as a guide for the boss parts 58 of the slide plate springs 57 when the monitor 3 is rotated from a rotation reference position (FIGS. 1D and 1E) and the elevator base 35 then moves up or down. When the monitor 3 is placed in the reversed state, the boss parts 58 of the slide plate springs 57 move to the outer side guide portions 60b, so that the monitor 3 can be rotated within the limits that the boss parts 58 move along the outer side guide portions 60b. More specifically, in accordance with this Embodiment 2, the engagement projections 59 of the slide plate springs 57 are set to have a length which can cover a region in which the engagement projections 59 can be respectively engaged with the engaging holes 44a and 44b of the brackets 25 and 26. Of course, the lengths of the inner side guide portion 60a and the outer side guide parts 60b are set up properly as needed. In order to accommodate the monitor 3 in the reversed state into the monitor accommodation case 2 (FIG. 1G), each of the outer side guide portions 60b is formed in such a way as to extend up to the same position as the lower end of the corresponding inner side guide portion 60a.

Edge portions each of which connects the straight line guide portion 60c to the inner side arc-shaped portion 60a or the outer side arc-shaped portion 60b are cut to form guide surfaces 60d. Because the provision of these guide surfaces 60d guides the boss parts 58 of the slide plate springs 57 even if the opening or closing angle of the monitor 3 is shifted from the rotation reference position somewhat, that is, even if the monitor 3 is shifted slightly from the state, as shown in FIGS. 1D and 1E, in which the monitor 3 is placed vertically, the monitor 3 can be pivoted certainly.

Next, an operation of positioning the monitor 3 in the normal state or reversed state at a predetermined position which is carried out by this monitor hinge device 51 will be explained.

In order to position the monitor 3 which is pulled out of the monitor accommodation case 2 at a predetermined position, the user pushes the monitor 3 to rotate the monitor about the monitor opening and closing axes 28 which are the first axis X. Because the monitor 3, the base 19, and the elevator base 35 are integral with one another with respect to any direction of rotation about the first axis X, the slide plate springs 57 attached to the elevator base 35 are also rotated and the engagement projections 59 are fitted into the engaging holes 43a or 43b, so that the monitor is positioned at the position. A movement of the slide plate springs 57 is caused by the boss parts 58 being respectively guided along the inner side guide portions 60a of the flat spring sliding guide grooves 60. FIG. 8(a) shows a state in which the engagement projections 59 are engaged with the engaging holes 43b, i.e. a state in which the monitor has been rotated by 30 degrees with respect to the vertical direction. Because the engagement projections 59 of the slide plate springs 57 are respectively forced against the surfaces of the brackets 25 and 26 by the elastic forces during this movement of the slide plate springs, the slide plate springs are moved against a moderate sliding resistance with a moderate torque being needed.

In order to reverse the monitor 3, the user moves the monitor 3 to a reverse reference position, as shown in FIG. 8(b), and then rotates the monitor 3 in this state about the second axis Y. The monitor shaft 12 is rotated together with the monitor 3, and, as a result, the elevator base 35 moves up through the engagement of the guide screw groove 14 with the screw engaging pins 39. FIG. 8(c) shows a state in which the slide plate springs 57 have moved up together with the elevator base 35. This movement of the elevator base 35 is caused by the boss parts 58 of the slide plate springs 57 being respectively guided along with the straight line guide portions 60c of the flat spring sliding guide grooves 60. Even when the monitor 3 is not placed correctly at the reverse reference position, the boss parts 58 are guided along the guide surfaces 60d and the slide plate springs 57 are certainly and linearly moved upwardly because the guide surfaces 60d are formed between the inner side guide portion 60a and the straight line guide portion 60c of each of the flat spring sliding guide grooves.

As the elevator base 35 moves up, the boss parts 58 move to the outer side guide portions 60b and the engagement projections 59 of the slide plate springs 57 respectively reach the circumferences on which the engaging holes 44a and 44b of the brackets 25 and 26 are formed. By pushing the monitor 3 in this state, the user can make the monitor 3 rotate about the monitor opening and closing axes 28 which are the first axis X. At this time, the boss parts 58 of the slide plate springs 57 are respectively guided and moved along the outer side guide portions 60b of the sliding guide grooves 60. FIG. 8(d) shows a state in which the engagement projections 59 are respectively engaged with the engaging holes 44b and the monitor is positioned. That is, the figure shows a state in which the monitor 3 placed in the reversed state has been rotated by 30 degrees with respect to the vertical direction.

Because the monitor hinge device 51 in accordance with this Embodiment 2 causes a movement of the monitor 3 about the first axis X by way of the engagement of the boss parts 58 of the slide plate springs 57 with the flat spring sliding guide grooves 60, the monitor 3 can be moved correctly. Furthermore, because in each of the flat spring sliding guide grooves 60, the guide surfaces 60d are formed at the connecting portions each for connecting the inner side guide portion 60a or the outer side guide portion 60b with the straight line guide portion 60c, the boss parts 58 are respectively guided and moved certainly along the guide surfaces 60d even when the monitor 3 has not been correctly rotated up to the reverse reference position. That is, the attitude of the monitor 3 can be modified. In this Embodiment 2, the slide plate springs 57, the engaging holes 43a and 43b, and the engaging holes 44a and 44b construct a positioning means.

Embodiment 3

Figure 9:
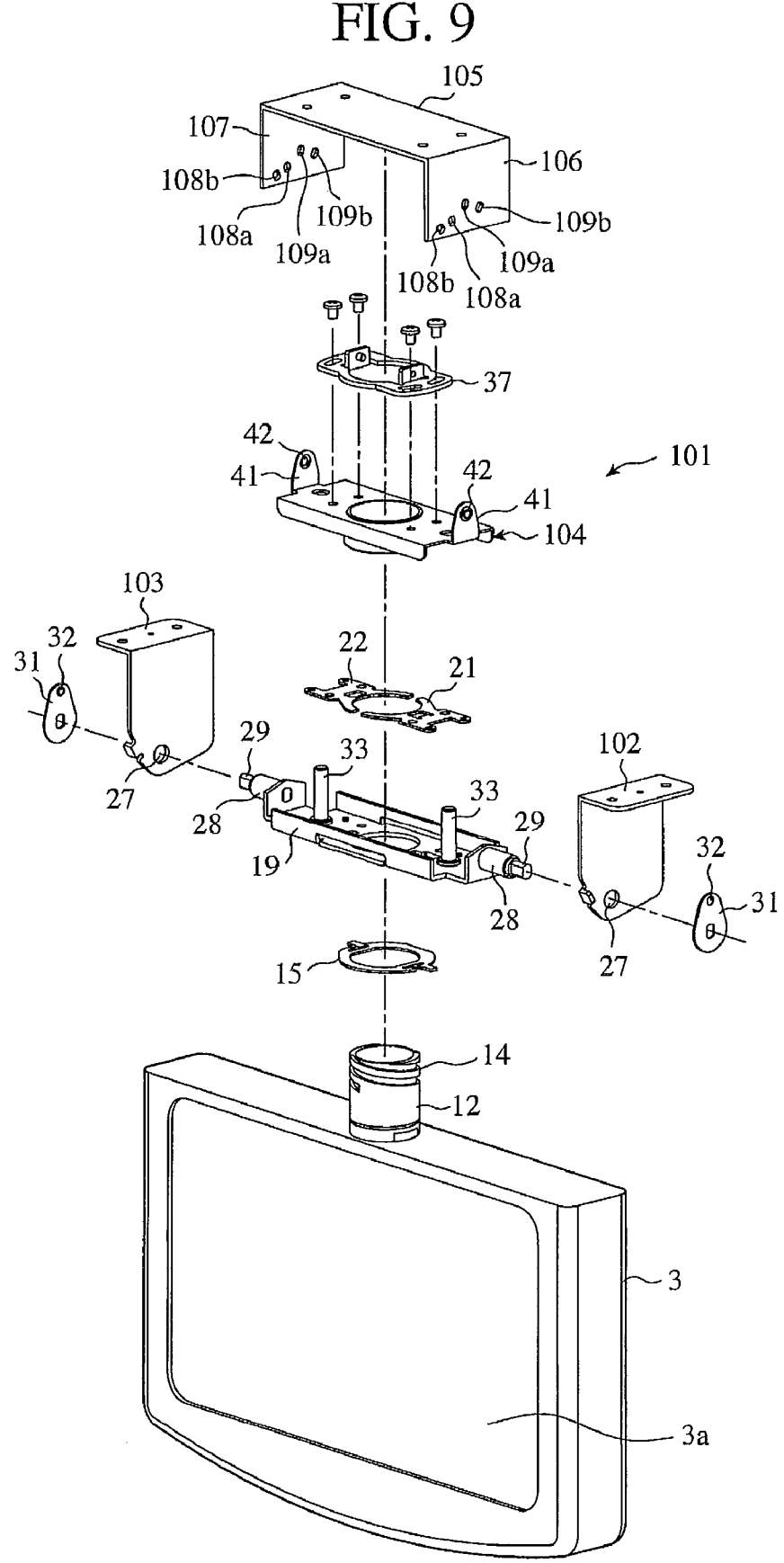
FIG. 9 is an exploded perspective view of a monitor hinge device in accordance with Embodiment 3.

A monitor hinge device in accordance with Embodiment 3 will be explained in detail with reference to drawings. The monitor hinge device in accordance with this Embodiment 3 includes, instead of the engaging holes formed in the brackets for rotatably supporting the monitor, other brackets having engaging holes so as to achieve simplification and miniaturization of the structure thereof. FIG. 9 is an exploded perspective view of the monitor hinge device in accordance with Embodiment 3, and FIGS. 10A to 10E are perspective views showing an operation of enabling the monitor to be rotated which is carried out by the monitor hinge device in accordance with Embodiment 3. In the following explanation, the explanation about the same components as those in accordance with Embodiment 1 shown in FIGS. 1 to 5 will be omitted hereafter with the components being designated by the same reference numerals as those shown in the figures.

In the monitor hinge device 101 in accordance with this Embodiment 3, no engaging holes 43a, 43b, 44a, and 44b are formed in each of the brackets 102 and 103 for supporting monitor opening and closing axes 28 disposed at the both ends of a base 19. Slide plate springs 31 are respectively attached to flat spring mounting members 29 which are the end portions of the monitor opening and closing axes 28, and engagement projections 32 of the slide plate springs are respectively forced flexibly against surfaces of the brackets 102 and 103.

An elevator base 104 is attached to the base 19 in such a way that the elevator base 104 can be moved up and down, like in the case of Embodiment 1. This elevator base 104 has a shorter length in the direction of the width of the monitor 3 than that of the elevator base 35 shown in Embodiment 1. The other structure of the elevator base 104 is the same as that of the elevator base shown in Embodiment 1. For example, locking flat spring parts 41 are respectively formed at the both ends of the elevator base 104 having a shorter length, and engagement projections 42 are respectively formed on the locking flat spring parts.

An engagement bracket 105 is fixed to a monitor accommodation case 2. The engagement bracket 105 has a pair of engagement plates 106 and 107. The engagement plates 106 and 107 are respectively extending along the locking flat spring parts 41 and are respectively in flexible contact with the engagement projections 42. Engaging holes 108a and 108*b* (on the circumference of a circle having a radius R1) and engaging holes 109*a* and 109*b* (on the circumference of a circle having a radius R2) with the same arrangement as the engaging holes formed in each of the brackets 25 and 26 in accordance with Embodiment 1 are formed in each of the engagement plates 106 and 107. The engagement bracket 105 has a short length, and, as shown in FIGS. 10A to 10E, is fitted between the brackets 102 and 103. The engagement projections 42, the engaging holes 108*a* and 108*b*, and the engaging holes 109*a* and 109*b* construct a positioning means in accordance with this Embodiment 3.

Figure 10A:
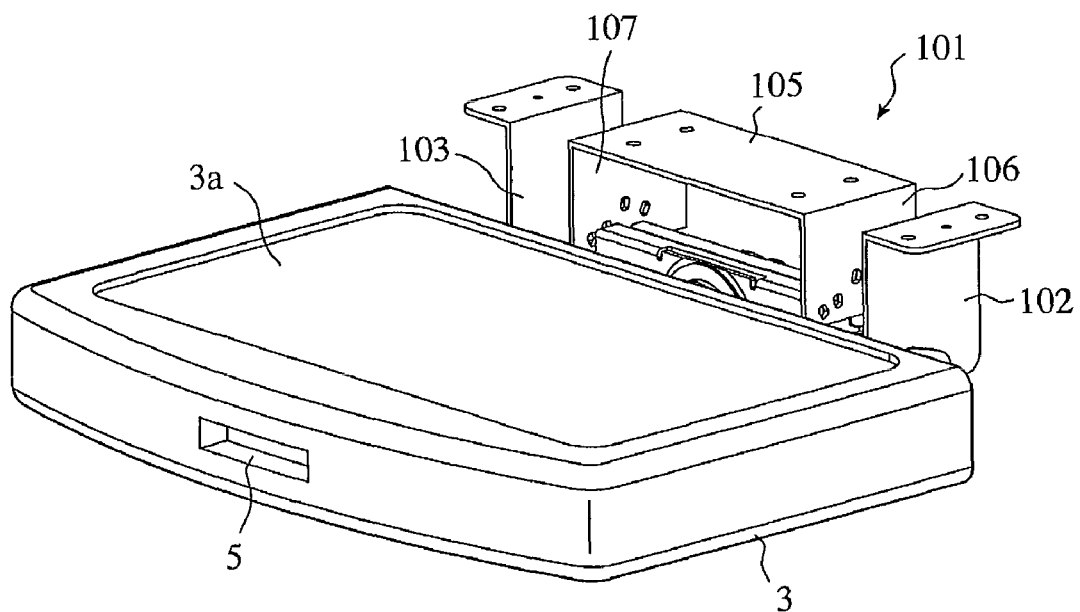
FIG. 10A is a perspective view showing an operating state of the monitor hinge device in accordance with Embodiment 3 in a state in which a monitor is accommodated.
Figure 10B:
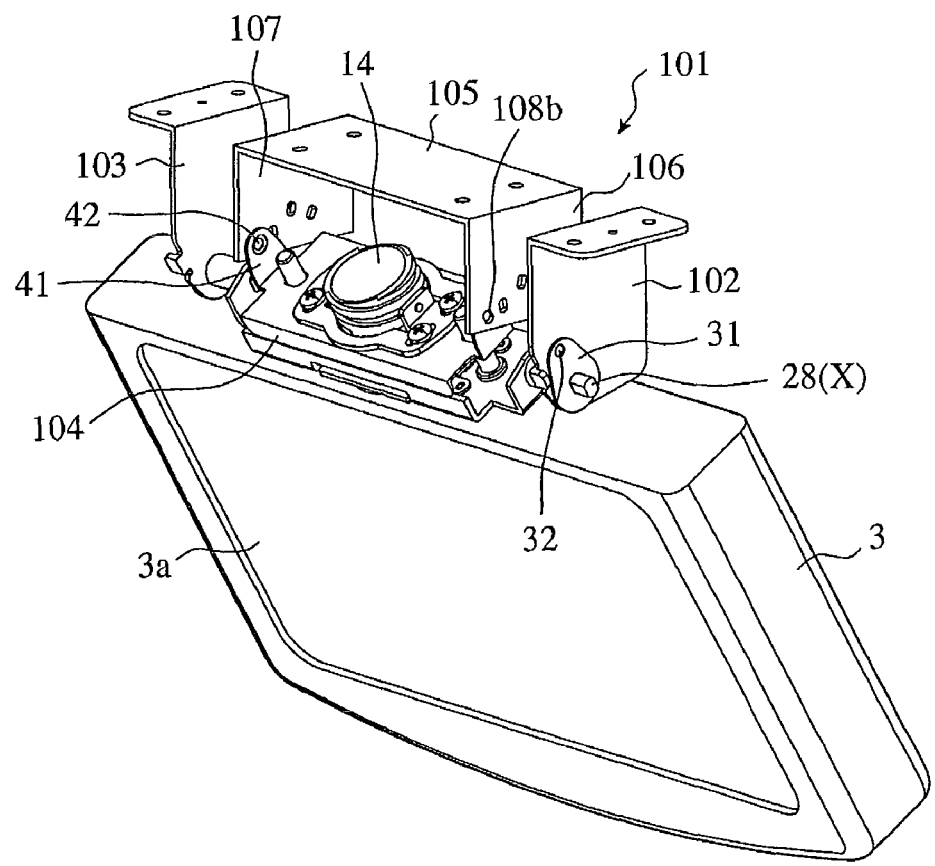
FIG. 10B is a perspective view showing an operating state of the monitor hinge device in accordance with Embodiment 3 in a state in which the monitor is opened and positioned.

The operation of the monitor hinge device 101 in accordance with this Embodiment 3 will be explained with reference to FIGS. 10A to 10E. FIG. 10A shows a state of the monitor hinge device 101 in which the monitor 3 is accommodated into the monitor accommodation case 2 (refer to FIGS. 1A and 1B). FIG. 10B shows a state in which the monitor 3 has been pulled out of the monitor accommodation case and has been rotated, and is positioned at a position at which a passenger can easily view the monitor. In the state shown in FIG. 10B, the monitor has been rotated by 120 degrees from the state in which the monitor is closed, like in the case of FIG. 1C. In this state, the engagement projections 42 of the locking flat spring parts 41 of the elevator base 104 are respectively engaged with the engaging holes 108*b* of the engagement plates 106 and 107 so that the monitor is positioned. Because the slide plate springs 31 respectively disposed at the end portions of the monitor opening and closing axes 28 are respectively forced flexibly against the brackets 102 and 103, a moderate sliding resistance is produced when the monitor 3 is rotated.

Figure 10C:
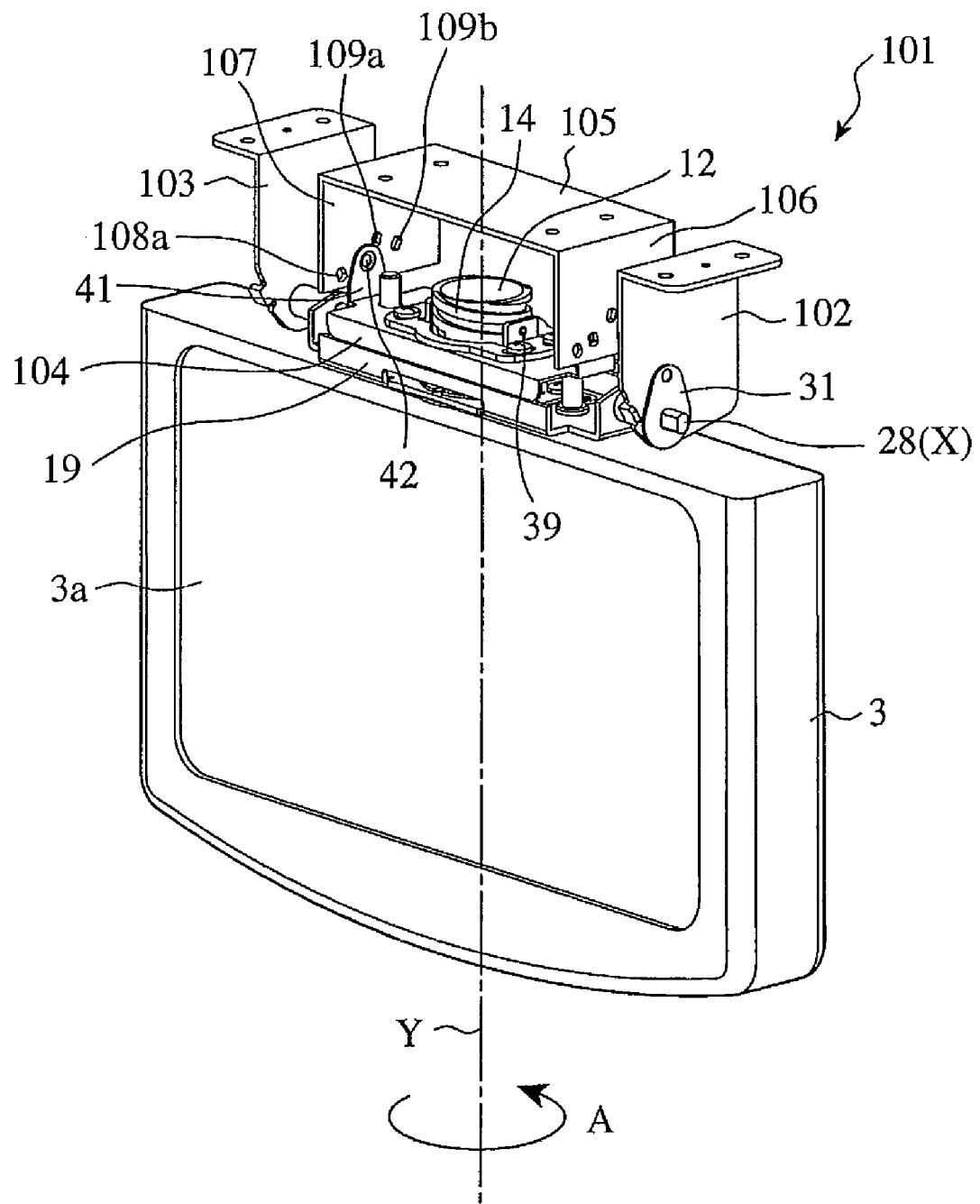
FIG. 10C is a perspective view showing an operating state of the monitor hinge device in accordance with Embodiment 3 in a state in which the monitor has been rotated by 90 degrees with respect to its closed position.
Figure 10D:
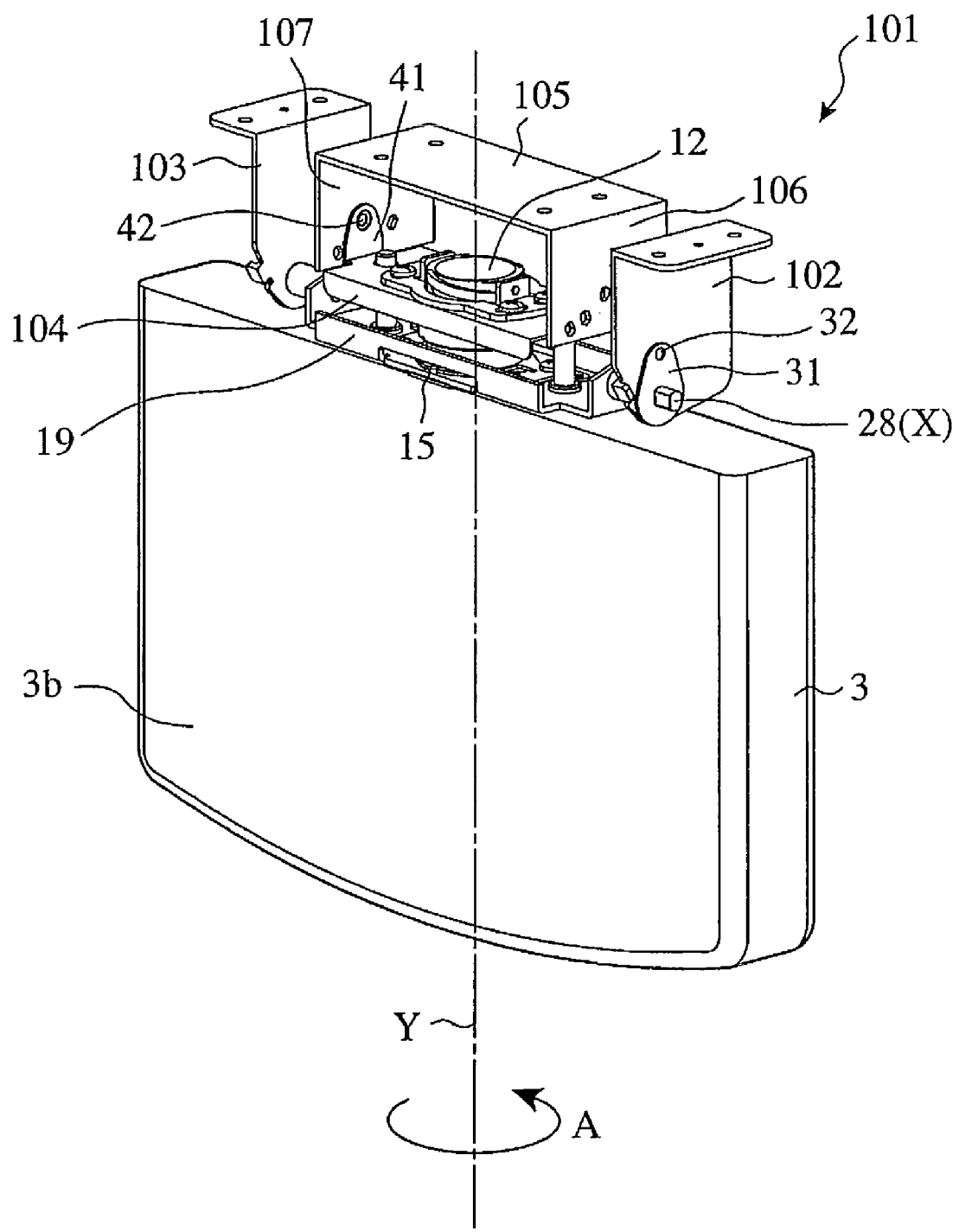
FIG. 10D is a perspective view showing an operating state of the monitor hinge device in accordance with Embodiment 3 in a state in which the monitor is reversed from the state shown in FIG. 5C.

In order to reverse the monitor 3, the user moves the monitor 3 to a rotation reference position first, as shown in FIG. 10C. When the user rotates the monitor 3 in this state (rotates the monitor about a second axis Y), screw engaging pins 39 engaged with a guide screw groove 14 of a monitor shaft 12 which is rotated is pushed upwardly and the elevator base 104 then moves up. A state in which the monitor 3 has been rotated by 180 degrees is shown in FIG. 10D. When the monitor has been rotated by 180 degrees, rotational position holding projections 17 of a rotational position holding plate 15 disposed on the side of the monitor 3 are fitted into rotation holding grooves 23 disposed on the side of the base 19 (refer to FIG. 4). Because a passenger who is performing an operation of rotating the monitor 3 can feel the fitting of the rotational position holding projections 17 into the rotation holding grooves 23, he or she can certainly operate the monitor 3 to place this monitor at a position at which the monitor is reversed by 180 degrees. As can be seen from FIGS. 10C and 10D, as the monitor 3 is reversed and the elevator base 104 moves up, each of the engagement projections 42 moves from a position on the circumference (the radius R1) along which the engaging holes 108*a* and 108*b* are formed to a position on the circumference (the radius R2) along which the engaging holes 109*a* and 109*b* are formed.

Figure 10E:
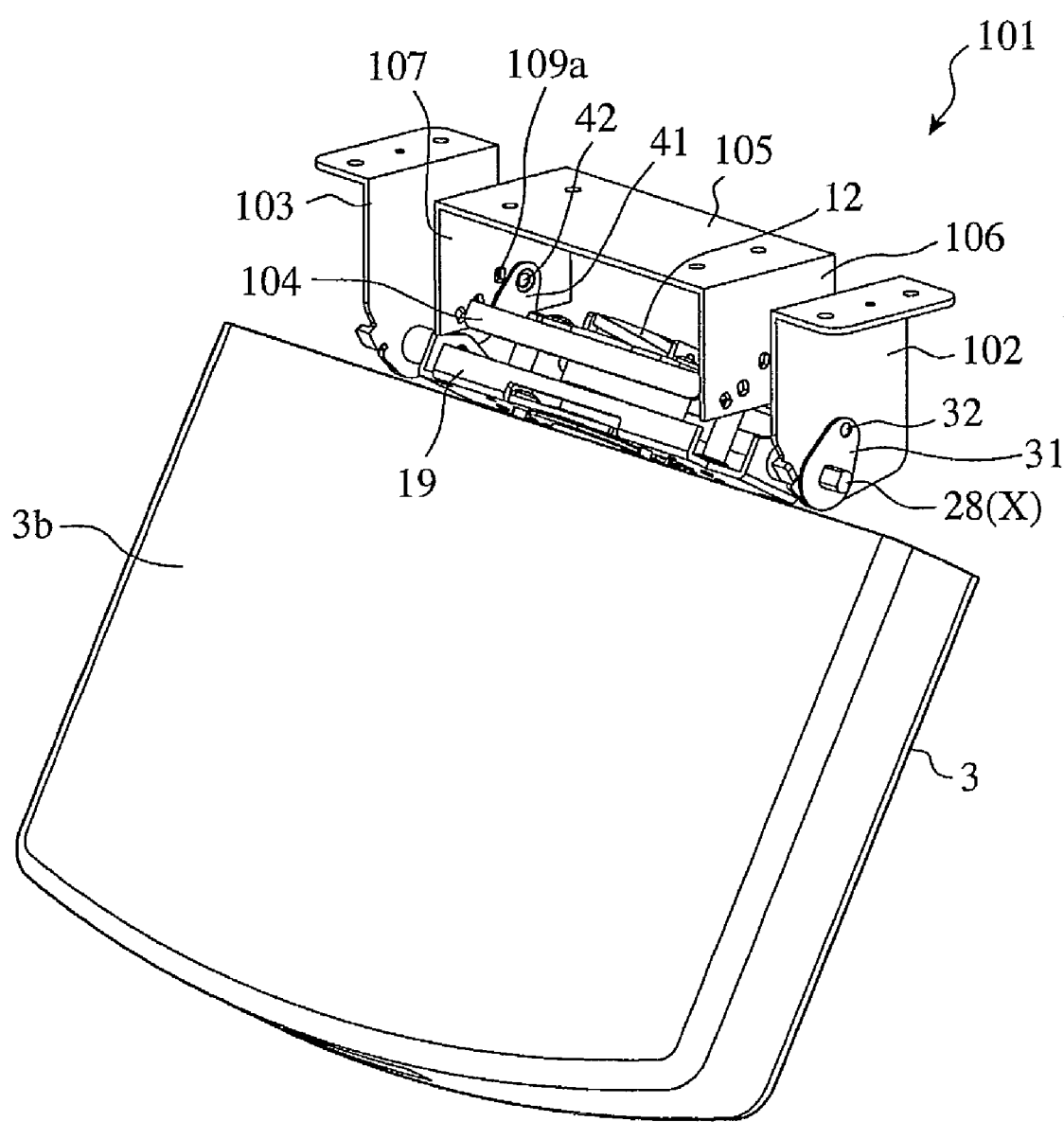
FIG. 10E is a perspective view showing an operating state of the monitor hinge device in accordance with Embodiment 3 in a state in which the monitor in the reversed state has been rotated and is positioned.

In this state, by rotating the monitor 3 about the first axis X, the passenger can position its screen 3*a* at a position at which the passenger can easily view the screen. When the monitor 3 is rotated, each of the engagement projections 42 of the elevator base 104 is moved along the circumference of the circle having the radius R2. When each of the engagement projections 42 is then fitted into the engaging hole 109*a* or 109*b*, the monitor is positioned. FIG. 10E shows a state in which the engagement projections 42 are respectively fitted into the engaging holes 107*b*, that is, a positioned state in which the monitor is fixed at a position at which the monitor has been rotated by 60 degrees with respect to the vertical direction.

As mentioned above, by further rotating the monitor 3 about the first axis X in the state, as shown in FIG. 10D or 10E, in which the monitor is reversed, the monitor 3 can be accommodated into the monitor accommodation case 2 in a state in which the screen 3*a* is oriented downwardly, as shown in FIG. 1G.

The monitor hinge device 101 in accordance with this Embodiment 3 provides not only the same advantage as that provided by the monitor hinge device of Embodiment 1, but also an advantage of being able to downsize the components, such as the elevator base 104, because the monitor hinge device in accordance with this Embodiment 3 includes, as a member in which engaging holes for positioning are formed, the engagement bracket 105 in addition to the brackets 102 and 103 for supporting the monitor opening and closing axes, and also includes the engaging holes 108*a*, 108*b*, 109*a*, and 109*b* which are formed in the engagement bracket. Furthermore, because the monitor hinge device includes, as the rotary components which are supported by the brackets 102 and 103, only the motor opening and closing axes 28, a design for covering the motor opening and closing axes can be easily created and does not uglify the monitor hinge device.

Also in this Embodiment 3, a guide groove which is the same as the flat spring sliding guide groove 60 in accordance with Embodiment 2 can be formed in each of the engagement plates 106 and 107 of the engagement bracket 105, and axes for flat spring can be respectively disposed at the both ends of the elevator base 104 and slide plate springs can be respectively attached to the axes for flat spring. In this variant, an advantage of improving the reliability of the operation is provided, like in the case of Embodiment 2.

Embodiment 4

Figure 11:
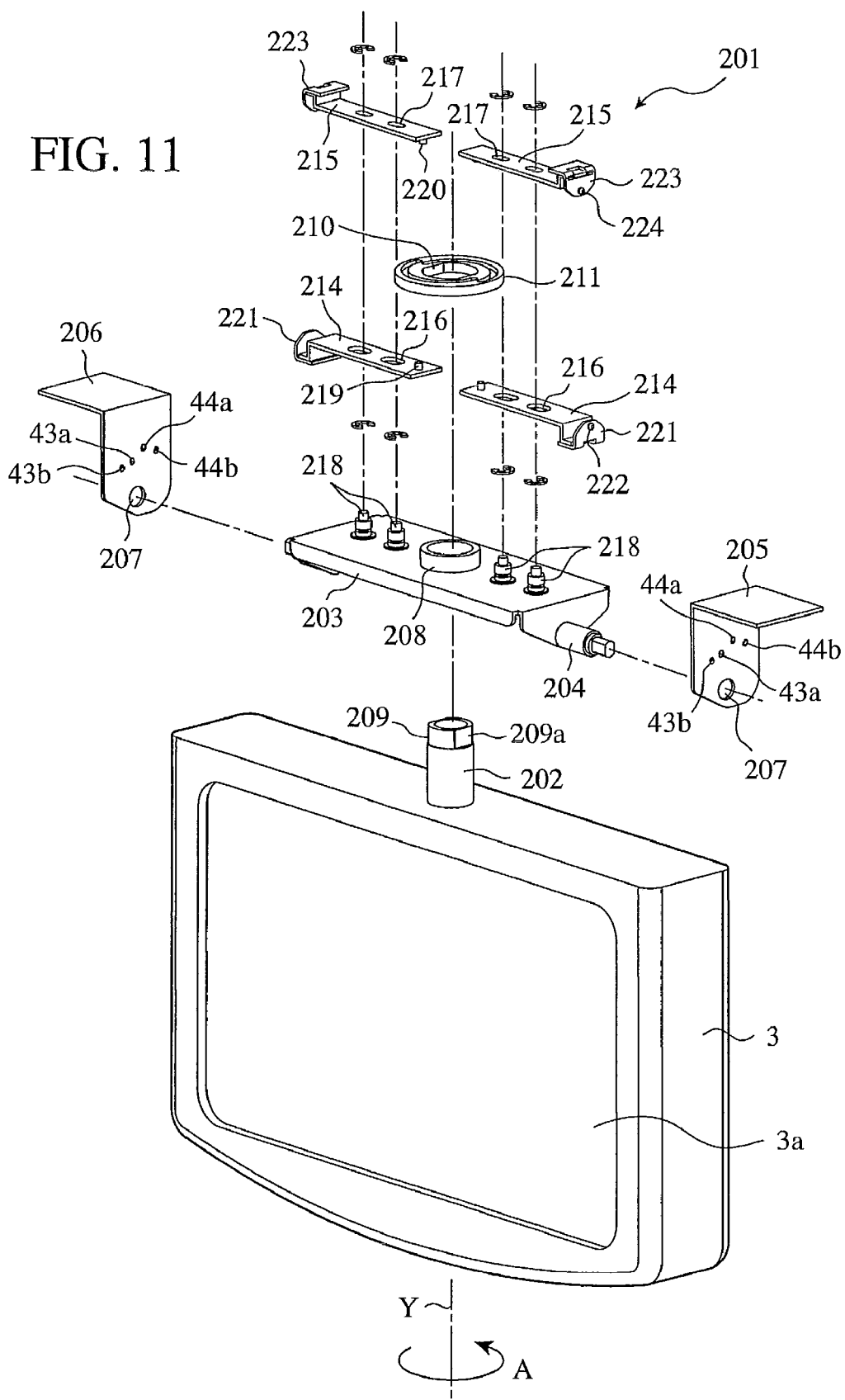
FIG. 11 is an exploded perspective view of a monitor hinge device in accordance with Embodiment 4.

A monitor hinge device in accordance with Embodiment 4 will be explained in detail with reference to drawings. The monitor hinge device in accordance with this Embodiment 4 converts a rotation of a monitor shaft into a horizontal direction movement via a cam without using an elevator base, and changes engagement projections which are engaged with engaging holes between when a monitor is placed in a normal state and when the monitor is placed in a reversed state by changing the phase of the cam. FIG. 11 is an exploded perspective view of the monitor hinge device in accordance with Embodiment 4, and FIGS. 12 to 15 are explanatory drawings showing an operation of the monitor hinge device. In the following explanation, the explanation about the same components as those in accordance with Embodiment 1 shown in FIGS. 1 to 5 will be omitted hereafter with the components being designated by the same reference numerals as those shown in the figures.

The monitor shaft 202 is disposed on an upper surface 3*c* of the monitor 3 of this monitor hinge device 201 with the monitor shaft's center being aligned with a second axis Y. The monitor shaft 202 is attached to a central part of a plate-shaped long and slender base 203 in such a way that the monitor shaft 202 cannot be moved in a direction of its axis, but can be only rotated. Monitor opening and closing axes 204 are attached to the both ends of the base 203. On the other hand, brackets 205 and 206 are disposed in the ceiling of a vehicle (in a monitor accommodation case 2) with a spacing between them, and a base support hole 207 whose center is aligned with a first axis X is formed in each of the brackets 205 and 206. The monitor opening and closing axes 204 attached to the both ends of the base 203 are respectively passed through the base support holes 207 of the brackets 205 and 206, and are respectively supported rotatably by the base support holes. Engaging holes 43a and 43b and engaging holes 44a and 44b for positioning and securing the monitor 3 at a predetermined position are disposed in each of the brackets 205 and 206.

A boss portion 208 is disposed in the central part of the base 203, and the monitor shaft 202 is passed through this boss portion 208. The top end of the monitor shaft 202 is formed as a cam mounting member 209 having flat surfaces 209a, and a cam plate 211 having a hole 210 whose cross-sectional shape is the same as that of the cam mounting member 209 is attached to the cam mounting member by fitting the cam mounting member into the hole 210. That is, the cam plate 211 can be rotated integrally with the monitor shaft 202.

A pair of cam grooves 212a and 212b and a pair of cam grooves 213a and 213b are respectively formed in the rear and front surfaces of the cam plate 211. The pair of cam grooves 212a and 212b formed in the rear face of the cam plate 211 (referred to as first cam grooves from here on) are shaped like a spiral, as shown in FIGS. 13(c) and 15(c) each showing a state of the cam plate which is viewed from the lower surface thereof. More specifically, each of the first grooves 212a and 212b is formed in such a way as to emanate from a point near the outer edge of the cam plate and extend progressively inwardly from the point, and each of the first grooves 212a and 212b extends over a region of about 180 degrees. The start point and the end point of each of the first cam grooves 212a and 212b are aligned with a line parallel to the first axis X. The pair of cam grooves 213a and 213b formed in the front surface of the cam plate 211 (referred to as second cam grooves from here on) are shaped like a spiral which extends in a direction opposite to that in which the first cam grooves 212a and 212b extend. More specifically, each of the second grooves 213a and 213b is formed in such a way as to emanate from a point near the outer edge of the cam plate and extend progressively inwardly in the opposite direction from the point, and each of the second grooves 213a and 213b extends over a region of about 180 degrees, too. The start point and the end point of each of the second cam grooves 213a and 213b are aligned with a line parallel to the first axis X, like those of each of the first cam grooves 212a and 212b.

While a pair of first arms 214 each having an end portion facing a rear surface peripheral portion of the cam plate 211 are arranged on the base 203 in parallel with the first axis X, a pair of second arms 215 each having an end portion facing a front surface peripheral portion of the cam plate 211 are arranged on the base 203 in parallel with the first axis X. Oblong holes 216 and 217 are respectively formed in the pair of arms 214 and the pair of arms 215, and these pairs of arms are supported by holding pins 218 disposed on the base 203 in such a way that the pairs of arms can be moved, by a fine amount of travel, along a direction of the first axis X. A cam pin 219 is disposed on an end portion of each of the pair of first arms 214 on the side of the cam plate 211. When the monitor 3 is placed in the normal state, the cam pins 219 are respectively engaged with the ends, which are located closer to the outer edge of the cam plate 211, of the first cam grooves 212a and 212b of the cam plate 211, as shown in FIG. 13(c). A cam pin 220 is disposed on an end portion of each of the pair of second arms 215 on the side of the cam plate 211. When the monitor 3 is placed in the normal state, the cam pins 220 are respectively engaged with the ends, which are located closer to the inner edge of the cam plate 211, of the second cam grooves 212a and 212b of the cam plate 211, as shown in FIG. 13(a).

Outer-side end portions of the pair of first arms 214 are bent downwardly, and a locking flat spring 221 made from an elastic member is attached to each of the end portions. An engagement projection 222 is disposed on the outer surface of the locking flat spring 221. This engagement projection 222 is located on the circumference on which the engaging holes 43a and 43b of each of the brackets 205 and 206 are formed. Outer-side end portions of the pair of second arms 215 are bent upwardly, and a locking flat spring 223 made from an elastic material is attached to each of the end portions. An engagement projection 224 is disposed on the outer surface of the locking flat spring 223. This engagement projection 224 is associated with the circumference on which the engaging holes 44a and 44b of each of the brackets 205 and 206 are formed. In this Embodiment 4, the cam plate 211, the first and second arms 214 and 215, the engagement projections 222 and 224, and the engaging holes 43a, 43b, 44a, and 44b construct a positioning means.

Next, the operation of this monitor hinge device 201 will be explained.

Figure 12:
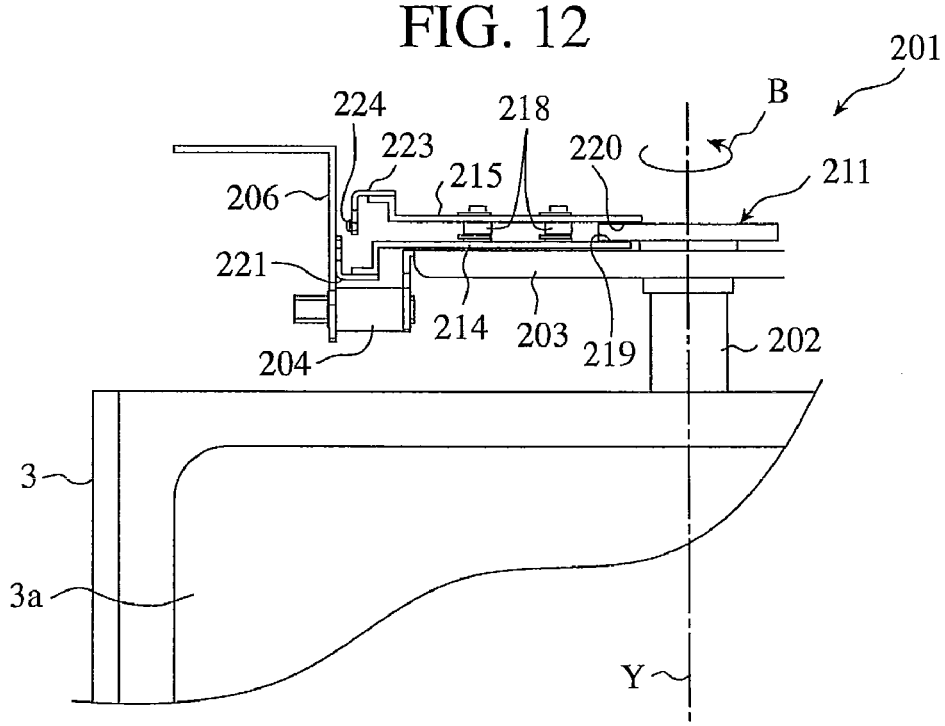
FIG. 12 is a front partial view of the monitor hinge device in accordance with Embodiment 4.
Figure 13:
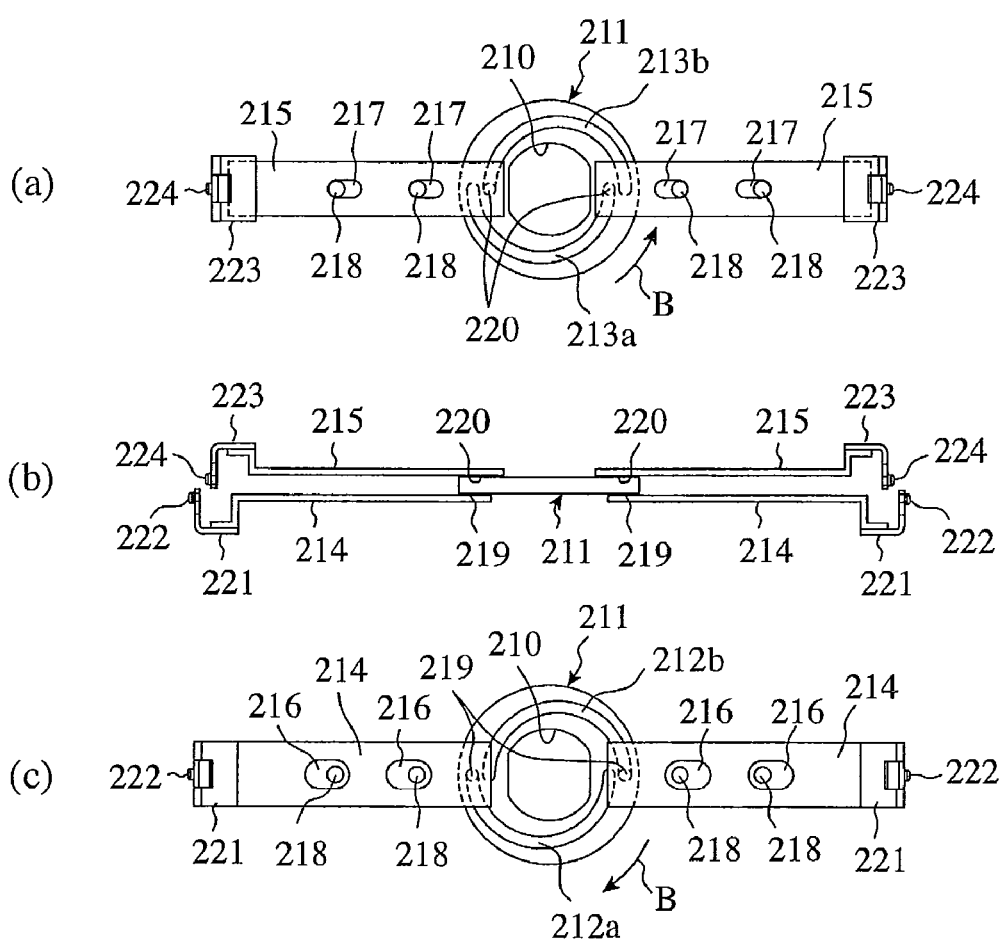
FIG. 13 are views showing a cam plate and so on in the monitor hinge device in accordance with Embodiment 4.

FIGS. 12 and 13 show a state in which the monitor 3 has been pulled out of the monitor accommodation case 2, and has been rotated by 90 degrees about the first axis X. The engagement projections 222 of the end portions of the first arms 214 are placed in a state in which the engagement projections are respectively located on the circumferences on which the engaging holes 43a and 43b are formed in the brackets 205 and 206, and are respectively pushed flexibly against the surfaces of the brackets 205 and 206, as shown in FIG. 12. In contrast, the engagement projections 224 of the end portions of the second arms 215 are respectively distant from the surfaces of the brackets 205 and 206, as shown in FIG. 12. Therefore, when a passenger pushes the monitor 3 in this state and furthermore rotates the monitor about the first axis X, the engagement projections 222 are respectively engaged with the engaging holes 43a or 43b of the brackets and the monitor is then positioned at a visibility position which the passenger desires (refer to FIG. 1C).

Figure 14:
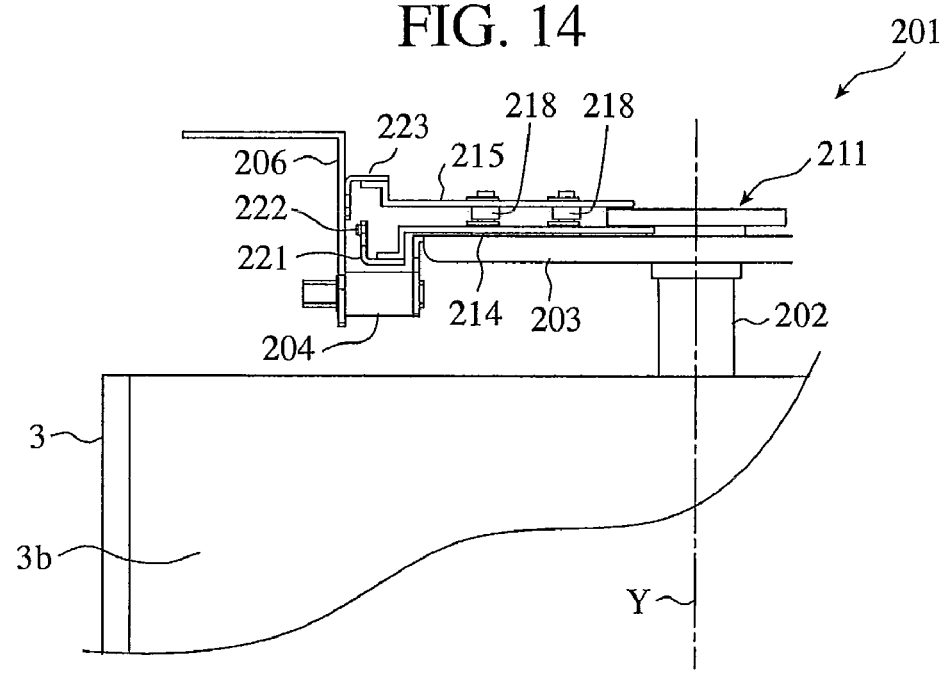
FIG. 14 is a front partial view of the monitor hinge device in accordance with Embodiment 4 in a reversed state.
Figure 15:
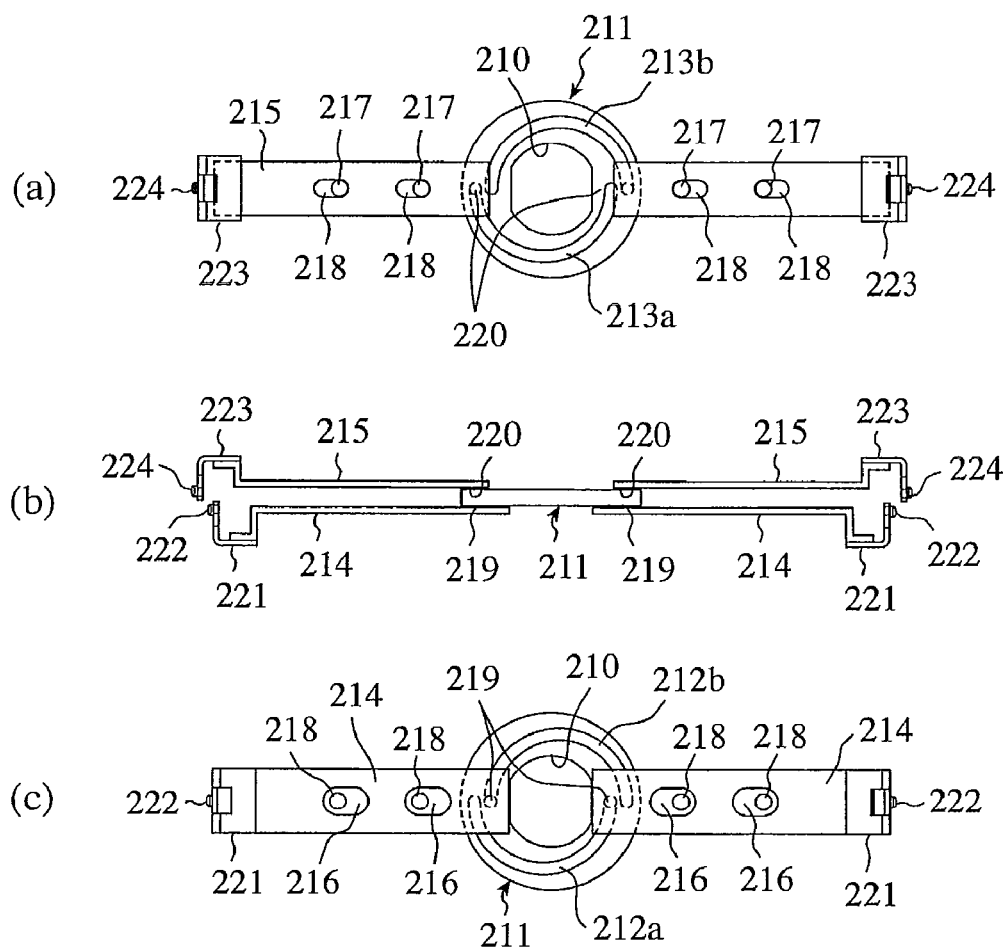
FIG. 15 are views showing a cam plate and so on in the reversed state in the monitor hinge device in accordance with Embodiment 4.

In order to reverse (pivot) the monitor 3, the passenger moves the monitor 3 to a reverse reference position first. The passenger then rotates the monitor 3 by 180 degrees about the second axis Y. As the monitor 3 is rotated, the monitor shaft 202 and the cam plate 211 which are integral with the monitor 3 are also rotated. When the cam plate 211 has been rotated by 180 degrees, the cam pins 219 of the end portions of the first arms 214 which have been engaged with the ends, which are located closer to the outer edge of the cam plate 211, of the first cam grooves 212a and 212b are engaged with the inner-side ends of the first cam grooves through the movement of the first cam grooves 212a and 212b, as shown in FIG. 15(c). More specifically, the pair of first arms 214 are moved inwardly by a very small distance, and the engagement projections 222 of the outer-side ends of the pair of first arms are respectively moved away from the surfaces of the brackets 205 and 206, as shown in FIG. 14. In contrast with this, the cam pins 220 of the end portions of the second arms 215 which have been engaged with the inner-side ends of the second cam grooves 213a and 213b are engaged with the outer-side ends of the second cam grooves through the movement of the second cam grooves 213a and 213b, as shown in FIG. 15(c). More specifically, the pair of second arms 215 are pushed out outwardly by a very small distance, and the engagement projections 224 of the outer-side ends of the pair of second arms are respectively forced against the surfaces of the brackets 205 and 206, as shown in FIG. 14.

After that, when the passenger rotates the monitor 3 about the first axis X, the engagement projections 224 are respectively engaged with the engaging holes 44a or 44b of the brackets, so that the monitor 3 can be positioned at an angle which the passenger desires.

The monitor hinge device 201 in accordance with this Embodiment 4 provides not only the same advantage as that provided by the monitor hinge device in accordance with Embodiment 1, but also a manufacturing advantage of being able to eliminate the need for providing the elevator base and construct the monitor hinge device with small parts.

Embodiment 5

Figure 16:
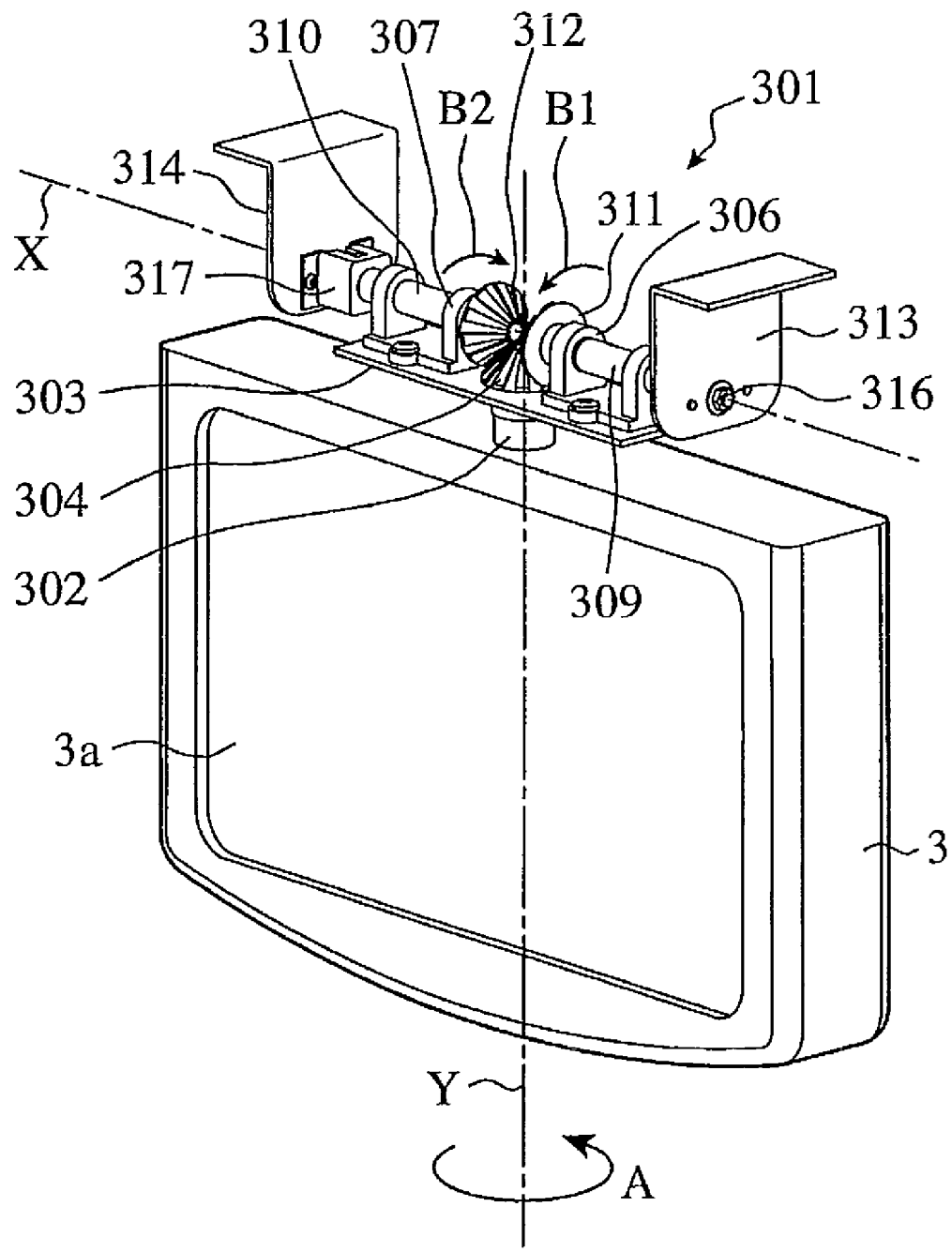
FIG. 16 is a perspective view of a monitor hinge device in accordance with Embodiment 5.
Figure 17:
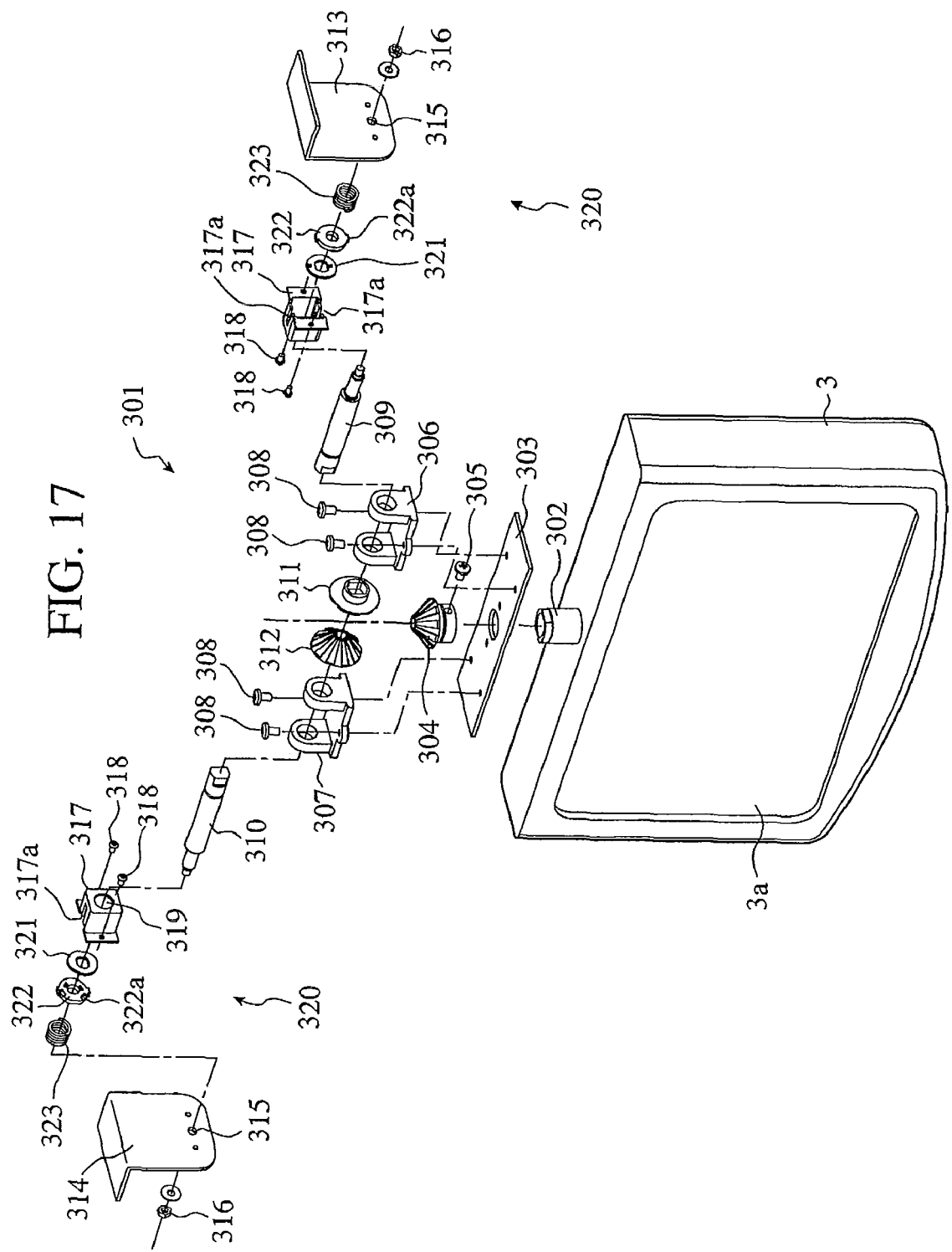
FIG. 17 is an exploded perspective view of the monitor hinge device in accordance with Embodiment 5.

A monitor hinge device in accordance with Embodiment 5 will be explained in detail with reference to drawings. The monitor hinge device in accordance with this Embodiment 5 is constructed in such a way as to enable a monitor rotate and pivot by using a bevel gear mechanism. FIG. 16 is a perspective outline view of the monitor hinge device, FIG. 17 is an exploded perspective view of the monitor hinge device, FIG. 18 is an enlarged view of a part of the monitor hinge device, and FIGS. 19A to 19E are explanatory drawings showing an operation of the monitor hinge device. In the following explanation, the explanation about the same components as those in accordance with Embodiment 1 shown in FIGS. 1 to 5 will be omitted hereafter with the components being designated by the same reference numerals as those shown in the figures.

A bevel gear 304 is fixed, via a base 303, to an upper portion of a monitor shaft 302, which is disposed on an upper surface of the monitor 3 of the monitor hinge device 301, with a screw 305. The monitor shaft 302 is rotatably attached to the base 303. Shaft holders 306 and 307 are fixed onto the base 303 on the both sides of the bevel gear 304 with screws 308. A first gear shaft 309 and a second gear shaft 310 are respectively supported rotatably by the shaft holders 306 and 307. A first bevel gear 311 and a second bevel gear 312 which are engaged with the bevel gear 304 are respectively attached to ends, on the side of the bevel gear 304, of the first gear shaft 309 and the second gear shaft 310. In this Embodiment, the specifications of these first bevel gears 311 and second bevel gear 312 are the same as the bevel gear 304. That is, the amount of rotation of the bevel gear 304 is the same as those of the first and second bevel gears 311 and 312 which are rotated by the bevel gear 304.

Brackets 313 and 314 are disposed in a vehicle (a monitor accommodation case 2) with a spacing between them, and the other ends of the gear shafts 309 and 310 are respectively passed through mounting holes 315 formed in the brackets 313 and 314, the mounting holes' centers being placed on a first axis X, and are respectively secured to the brackets by tightening nuts 316. A box-shaped anti-rotation stopper 317 is fixed to the internal surface of each of the brackets 313 and 314 with screws 318. Shaft through holes 319 for respectively allowing the first and second gear shafts 309 and 310 to pass therethrough are respectively formed in surfaces of the anti-rotation stoppers 317, the surfaces being opposite to the sides of the anti-rotation stoppers respectively facing the brackets 313 and 314, and the gear shafts 309 and 310 are respectively penetrated through the box-shaped anti-rotation stoppers 317 by way of the shaft through holes 319 and are respectively secured to the brackets 313 and 314.

In each of the anti-rotation stoppers 317, a cam mechanism 320 for positioning the monitor 3 at a predetermined position is contained. While these cam mechanisms 320 are symmetrically arranged on the sides of the brackets 313 and 314, the cam mechanisms have the same structure. A flat ring-shaped cam engaging member 321, which is disposed as a member of the cam mechanism 320, is attached to each of the gear shafts 309 and 310 in such a way that the flat ring-shaped cam engaging member 321 cannot be rotated, and a ring-shaped cam plate 322 which is another member of the cam mechanism 320 is disposed in such a way as to be in contact with the cam engaging member 321. The cam plates 322 are not fixed with respect to directions of the axis of the gear shafts 309 and 310. As shown in FIGS. 19A to 19E, two whirl-stop projections 322a are projected from two parts in a direction of the diameter (i.e. top and bottom parts) on the outer surface of each of the cam plates 322. On the other hand, whirl-stop slits 317a are formed in an upper surface and a lower surface of each of the anti-rotation stoppers 317. The whirl-stop projections 322a are respectively fitted into these whirl-stop slits 317a, and therefore each of the cam plates 322 cannot be rotated. A spring 323 is disposed, as an elastic member, between each of the cam plates 322 and each of the brackets 313 and 314, and the cam plate 322 is flexibly pushed against the cam engaging member 321 by this spring 323.

Engagement projections 324a and 324b having different phases and located at different positions with respect to a radial direction are disposed on a surface, which faces the corresponding cam plate 322, of each of the cam engaging members 321. Two pairs of engagement grooves 325a and 325b and 326a and 326b, the engagement grooves of each pair having different phases and being located at different positions with respect to a radial direction, are disposed on a surface, which faces the corresponding cam engaging member 321, of each of the cam plates 322. Because each of the cam plates 322 cannot be rotated by the corresponding anti-rotation stopper 317, the arrangement of the engagement grooves 325a, 325b, 326a, and 326b are fixed. In this Embodiment 5, the cam mechanisms 320 construct a positioning means.

Next, an operation of enabling the monitor 3 to be rotated and positioning the monitor 3 which is carried out by the monitor hinge device 301 in accordance with this Embodiment 5 will be explained with reference to FIGS. 19A to 19E. A state of the cam mechanism 320 of the bracket 314 shown on the left-hand side, which corresponds to a state of the monitor 3, as well as the state of the monitor 3, are shown in each of FIGS. 19A to 19E.

Figure 19B:
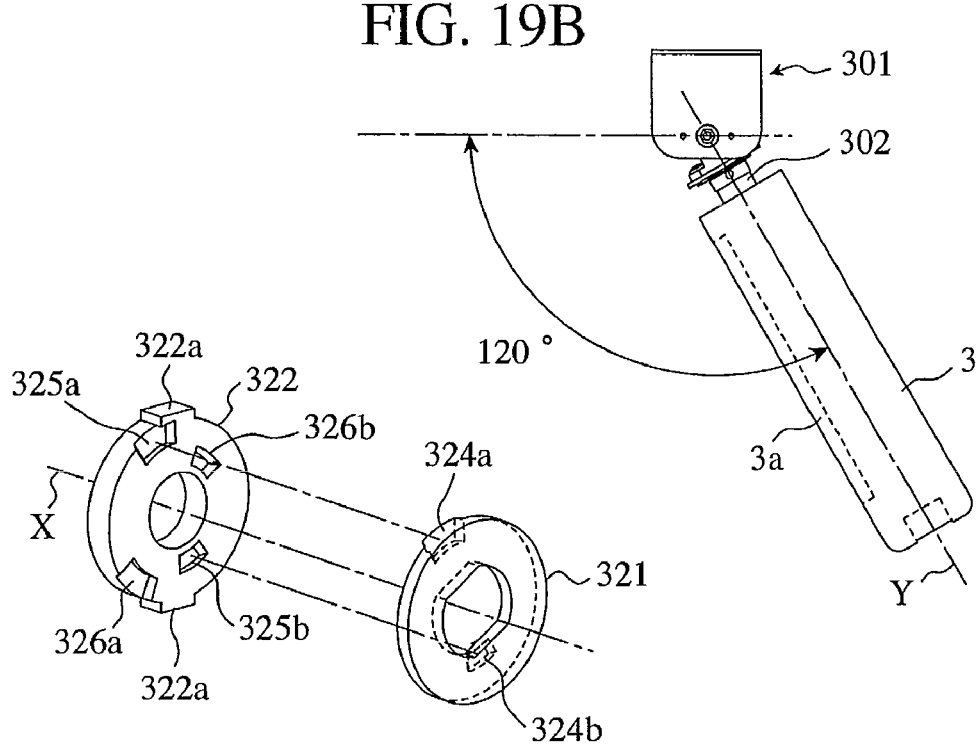
FIG. 19B is a perspective view showing operations of a monitor and a cam mechanism of the monitor hinge device in accordance with Embodiment 5 in a state in which the monitor is opened at 120 degrees.

FIG. 19A shows a state in which the monitor 3 is accommodated into the monitor accommodation case 2, as shown in Figs. 1A and 1B. When a locking mechanism 4 (refer to FIG. 1B) is released in this state, the monitor 3 can be rotated (opened) downwardly about the first axis X. In this monitor hinge device 301, the first axis X is the central axis of the gear shafts 309 and 310. When the monitor 3 is rotated downwardly, the first bevel gear 311 and the second bevel gear 312 are rotated in the same direction by the bevel gear 304 fixed to the monitor shaft 302, and the cam engaging member 321 in each of the cam mechanisms 320 is rotated in a direction shown by an arrow, as shown in FIG. 19A. As shown in FIG. 19B, when the monitor 3 is rotated by a predetermined amount, the engagement projections 324a and 324b of each of the cam engaging members 321 are respectively fitted into the engagement grooves 325a and 325b of the corresponding cam plate 322, and the monitor 3 is positioned. The example shown in FIG. 19B is in a state in which the monitor 3 is positioned and fixed after the monitor 3 has been rotated by 120 degrees with respect to its closed position.

When the monitor 3 is positioned by rotating the monitor 3 in this normal state, only the engagement grooves 325a and 325b for positioning the monitor in the normal state exist in a range corresponding to the range in which the engagement projections 324a and 324b can move on the side of each of the cam plates 322.

Figure 19C:
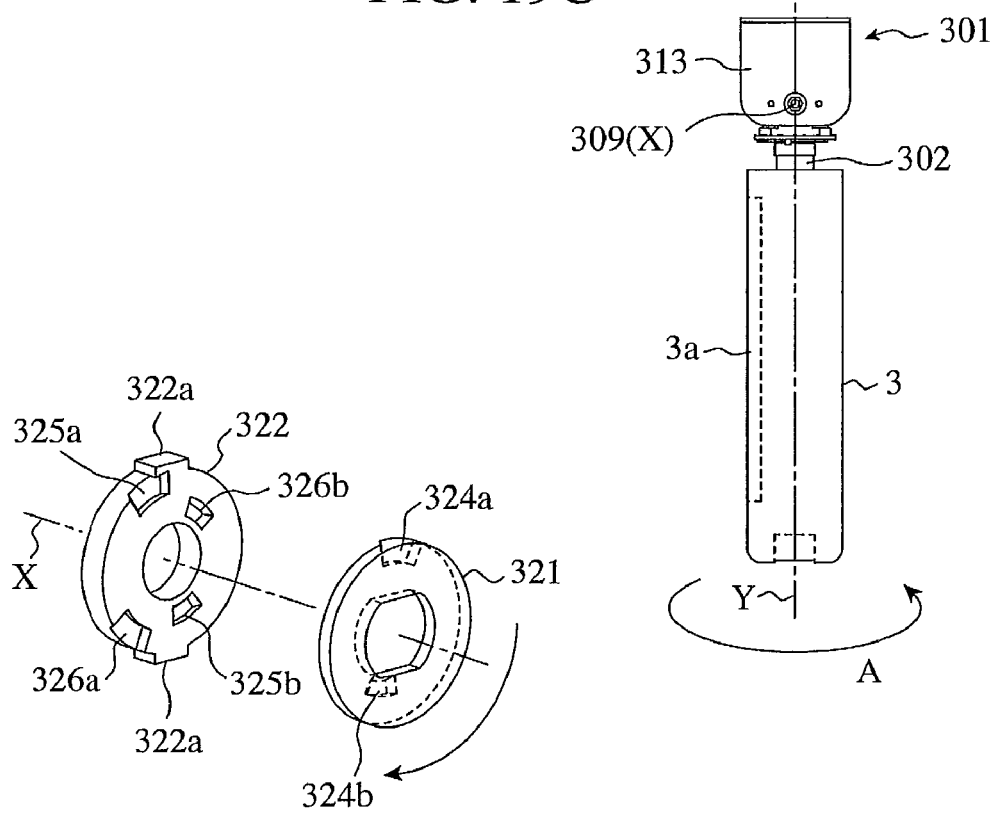
FIG. 19C is a perspective view showing operations of the monitor and the cam mechanism of the monitor hinge device in accordance with Embodiment 5 in a state in which the monitor has been rotated by 90 degrees with respect to its closed position.

In order to reverse the monitor 3, the monitor 3 is moved to a reverse reference position first, as shown in FIG. 19C. That is, the monitor is placed in a state in which the monitor has an angle of 90 degrees with respect to the closed position (i.e. a state in which the monitor is oriented toward the vertical direction). The monitor 3 is then rotated about a second axis Y. For example, the monitor is rotated (pivoted) in a direction shown by an arrow A of FIGS. 16 and 19C. When the monitor 3 is rotated in the direction shown by the arrow A, the first bevel gear 311 is rotated in a direction shown by an arrow B1 through the engagement with the bevel gear 304 on the monitor shaft 302, and the second bevel gear 312 is rotated in a direction shown by an arrow B2. Each of the first gear shaft 309 and the second gear shaft 310 is also rotated in the same direction as that in which the bevel gear is rotated, and each of the cam engaging members 321 of the cam mechanisms 320 is also rotated in the same direction as that in which the bevel gear is rotated. Because the cam mechanism 320 of the bracket 314 on the left-hand side of FIG. 17 is shown in FIG. 19C, the cam engaging member 321 is rotated in the direction of B2.

Figure 19D:
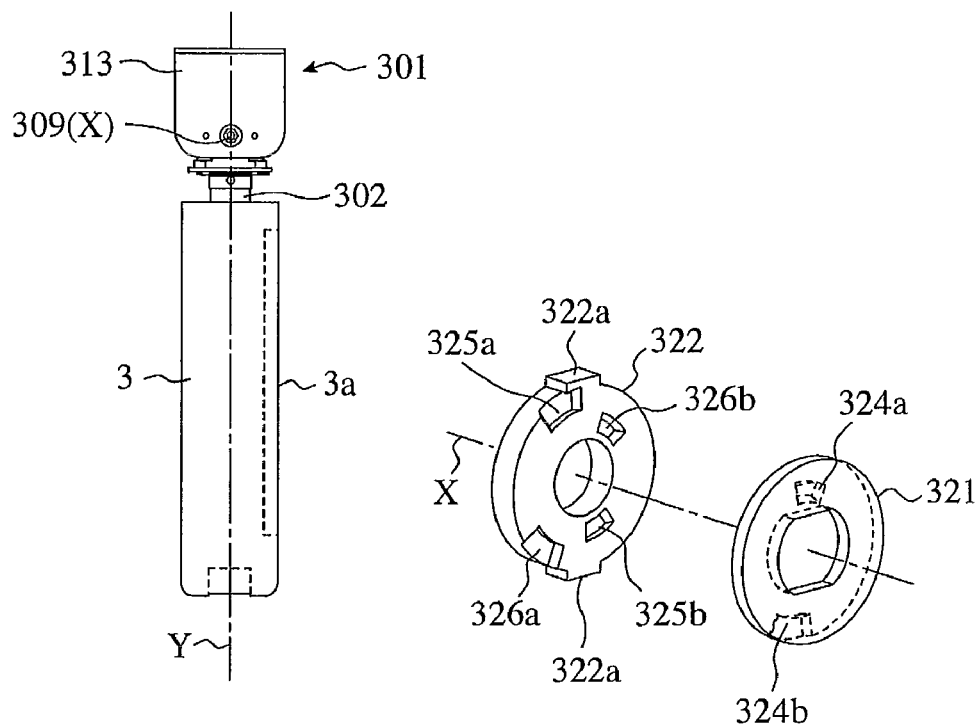
FIG. 19D is a perspective view showing operations of the monitor and the cam mechanism of the monitor hinge device in accordance with Embodiment 5 in a state in which the monitor is reversed from the state shown in FIG. 10C.
Figure 19E:
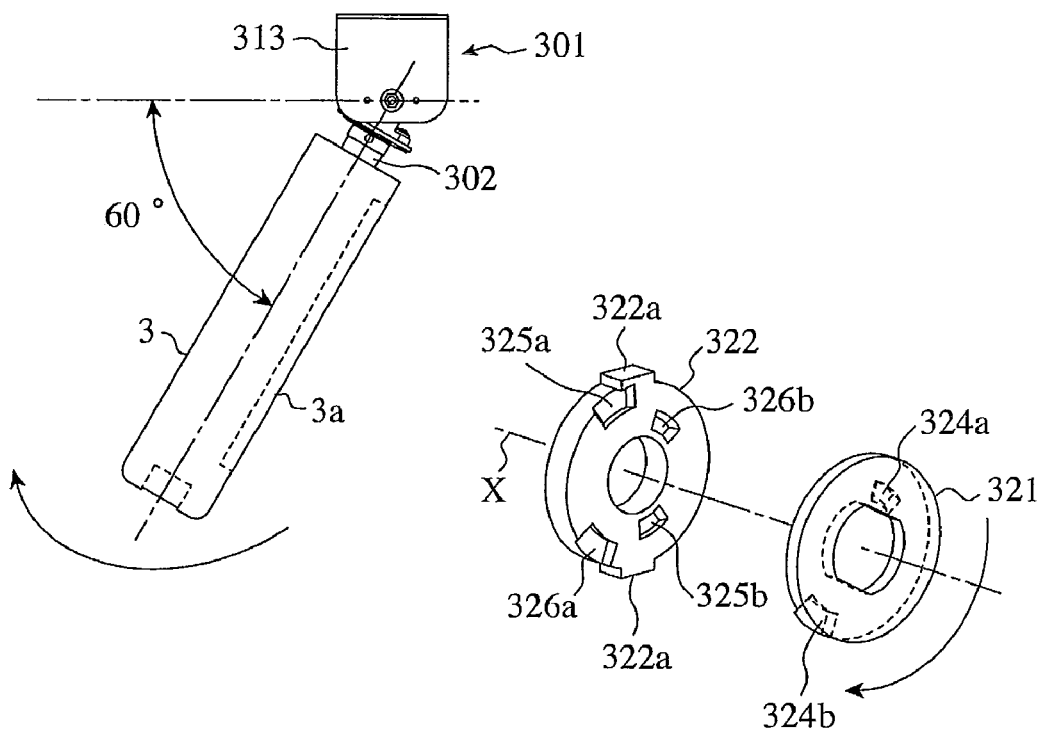
FIG. 19E is a perspective view showing operations of the monitor and the cam mechanism of the monitor hinge device in accordance with Embodiment 5 in a state in which the monitor in the reversed state has been rotated and is positioned.

When the monitor 3 is reversed, that is, when the monitor is rotated by 180 degrees about the second axis Y, the cam engaging member 321 is also rotated by 180 degrees in the direction of B1, as shown in FIG. 19D, and the engagement projections 324a and 324b are also in an arrangement state in which their phases are shifted by 180 degrees from the state shown in FIG. 19C. When the monitor 3 in this state is rotated about the first axis X (in the direction shown by the arrow), the screen 3a of the monitor 3 in the reversed state can be positioned at a visibility position. As the monitor 3 is rotated in the direction of the arrow shown in FIG. 19E, the first bevel gear 311 and the second bevel gear 312 are rotated in the same direction by the bevel gear 304 fixed to the monitor shaft 302, and the cam engaging member 321 in each of the cam mechanisms 320 is rotated in the direction shown by the arrow, as shown in FIG. 19E. When the monitor 3 has been rotated by a predetermined amount, the engagement projections 324a and 324b of the cam engaging member 321 are fitted into the engagement grooves 326a and 326b of the other set of the cam plate 322, and the monitor 3 is positioned. The cam mechanism 320 of the bracket 313 shown on the right-hand side of the figure also performs the same operation. The example shown in FIG. 19E is in a state in which the monitor 3 is positioned and fixed at a position having an angle of 60 degrees with respect to the closed position.

Because a spring force toward the cam engaging member 321 is always exerted upon the cam plate 322 in each of the cam mechanisms 320, the engagement of the engagement projections 324a and 324b with the engagement grooves 325a and 325b or 326a and 326b with a feeling of detents is propagated to the operator.

In this Embodiment 5, only one positioning position is shown for both of the normal state and the reversed state of the monitor 3, though the monitor can be positioned at one of two or more positions in both the normal state and the reversed state by forming two or more sets of engagement grooves in each of the cam plates 322 for each of the normal state and the reversed state.

The monitor hinge device 301 in accordance with Embodiment 5 provides not only the same advantage as that provided by Embodiment 1, but also an advantage of being able to make its structure as a whole compact with the combination of the small parts, such as the bevel gears 304, 311, and 312 and the gear shafts 309 and 310.

Embodiment 6

Figure 20:
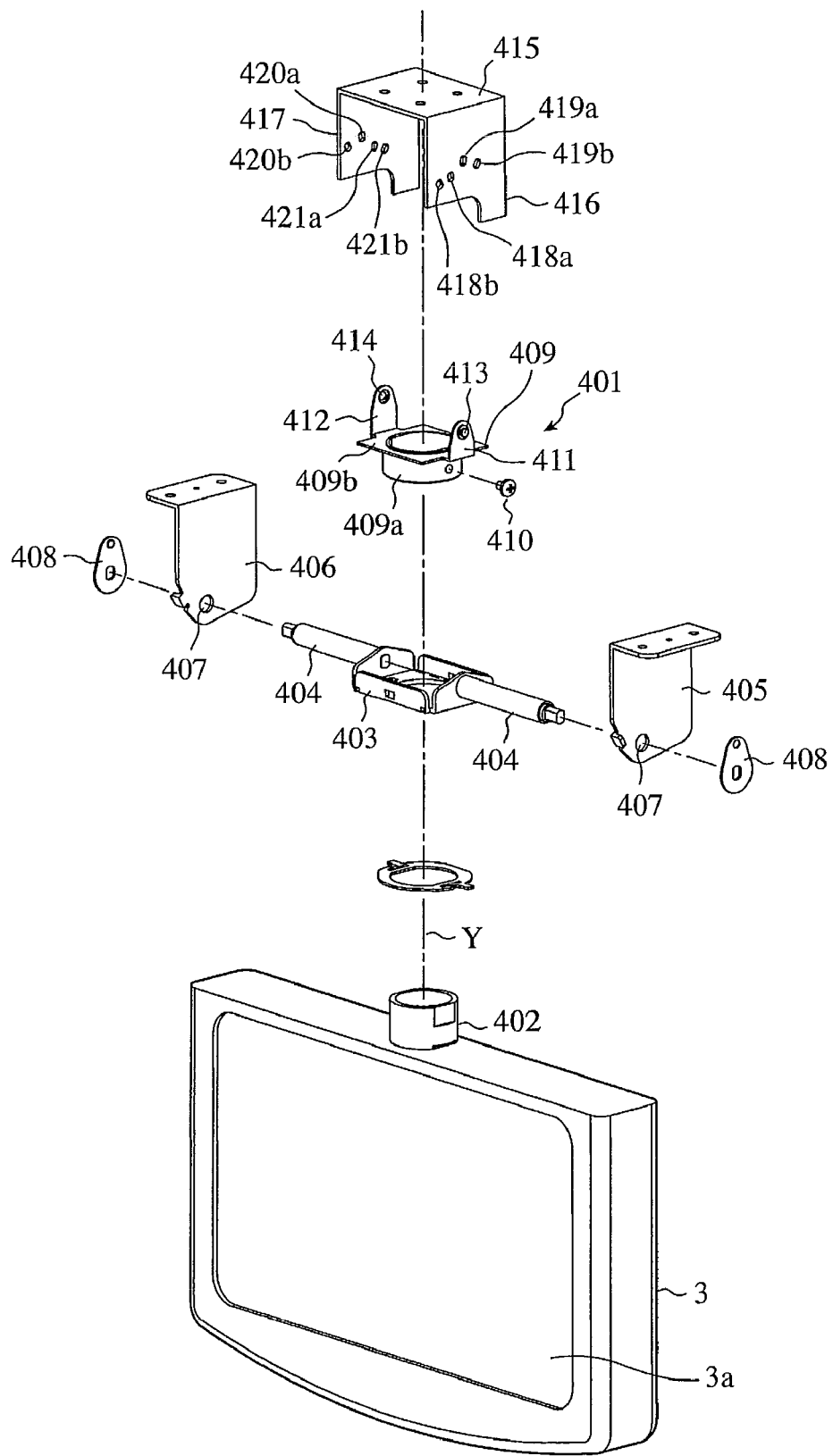
FIG. 20 is an exploded perspective view of a monitor hinge device in accordance with Embodiment 6.

A monitor hinge device in accordance with Embodiment 6 will be explained in detail with reference to drawings. FIG. 20 is an exploded perspective view of the monitor hinge device in accordance with Embodiment 6, and FIGS. 21A to 21E are perspective views showing an operation of enabling a monitor to be rotated which is carried out by the monitor hinge device in accordance with Embodiment 6. In the following explanation, the explanation about the same components as those in accordance with Embodiment 1 shown in FIGS. 1 to 5 will be omitted hereafter with the components being designated by the same reference numerals as those shown in the figures.

A monitor shaft 402 disposed on an upper surface of the monitor 3 of this monitor hinge device 401 is supported by a base 403 in such a way that the monitor shaft can be rotated, but cannot be moved in a direction of its axis. Monitor opening and closing axes 404 are attached to both ends of the base 403. These monitor opening and closing axes 404 are respectively passed through base support holes 407 respectively formed in brackets 405 and 406 (corresponding to the brackets 25 and 26 in accordance with Embodiment 1), and are supported rotatably by the brackets. The central axis of the base support holes 407 is a first axis X, and the base 403 can be rotated about the first axis X. Engaging holes 43a, 43b, 44a, and 44b as shown in Embodiment 1 are not formed in each of the brackets 405 and 406. A slide plate spring 408 which is flexibly forced against a surface of each of the brackets 405 and 406 is attached to an end of each of the monitor opening and closing axes 404 which projects outwardly from each of the brackets 405 and 406. As previously explained in another embodiment, because this slide plate springs 408 are respectively in flexible contact with the brackets 405 and 406, a moderate sliding resistance is produced when the monitor 3 is rotated. More specifically, a moderate torque is needed in order to slide the monitor 3.

A spring base 409 is fixed to the monitor shaft 402. The spring base 409 is provided with a cylinder portion 409a into which an upper portion of the monitor shaft 402 is fitted, and a plate portion 409b disposed on the cylinder portion 409a, and the cylinder portion 409a is fixed to the monitor shaft 402 with a screw 410. Lock flat springs 411 and 412 which are opposite to each other in a direction parallel to the first axis X stand on the plate portion 409b of the spring base 409. The locking flat springs 411 and 412 differ in height, and a first engagement projection 413 and a second engagement projection 414 are respectively disposed on inner surfaces of the leading end portions of the locking flat springs.

A bracket 415 is mounted to a monitor accommodation case 2. The bracket 415 has a first engagement plate 416 and a second engagement plate 417 respectively extending along the locking flat springs 411 and 412. In the first engagement plate 416 which is located on the right-hand side of the monitor hinge device when viewed from the front (a state as shown in FIG. 20), engaging holes 418a and 418b with each of which the above-mentioned first engagement projection 413 is engaged when the monitor 3 in a normal state is rotated about the first axis X are formed, and engaging holes 419a and 419b with each of which the above-mentioned second engagement projection 414 is engaged when the monitor 3 in a reversed state is rotated about the first axis X are also formed. Similarly, also in the second engagement plate 417 which is located on the left-hand side of the monitor hinge device when viewed from the front, engaging holes 420a and 420b with each of which the above-mentioned second engagement projection 414 is engaged when the monitor 3 in the normal state is rotated about the first axis X are formed, and engaging holes 421a and 421b with each of which the above-mentioned first engagement projection 413 is engaged when the monitor 3 in the reversed state is rotated about the first axis X are also formed. In this Embodiment 6, the first and second engagement projections 413 and 414, the engaging holes 418a, 418b, 419a, and 419b, and the engaging holes 420a, 420b, 421a, and 421b construct a positioning means.

Figure 21A:
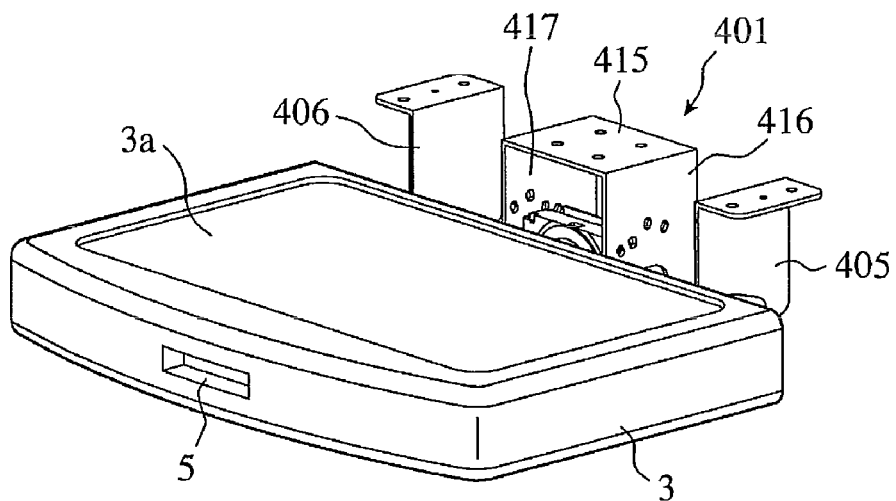
FIG. 21A is a perspective view showing an operating state of the monitor hinge device in accordance with Embodiment 6 in a state in which a monitor is accommodated.
Figure 21B:
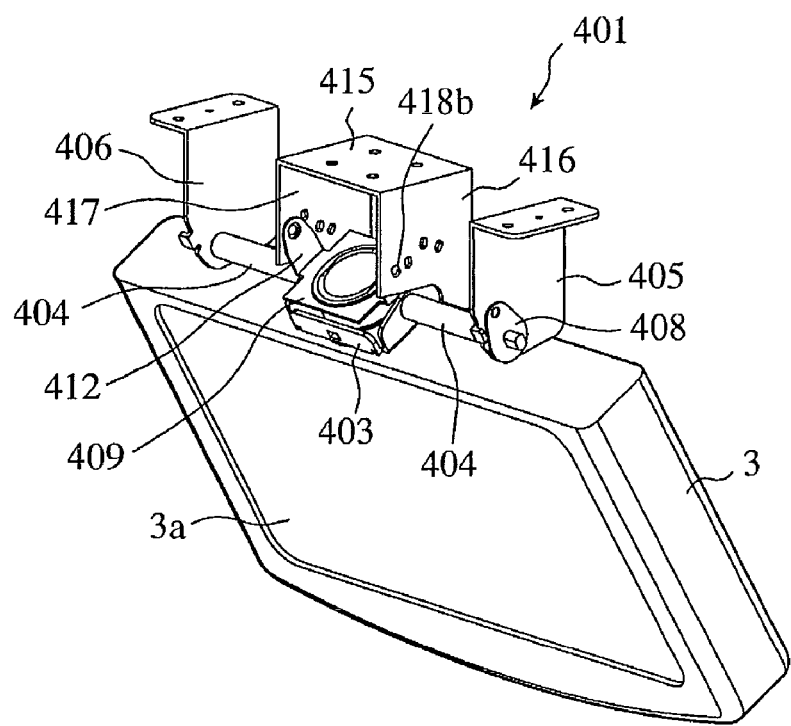
FIG. 21B is a perspective view showing an operating state of the monitor hinge device in accordance with Embodiment 6 in a state in which the monitor is opened and positioned.

Next, the positioning operation carried out by the monitor hinge device 401 in accordance with this Embodiment 6 will be explained with reference to FIGS. 21A to 21E. FIG. 21A shows a state of the monitor hinge device 401 when the monitor 3 is accommodated into the monitor accommodation case 2. The monitor 3 can be rotated downwardly by releasing a locking mechanism 4 (refer to FIG. 1B) in this state. FIG. 21B shows a state in which the monitor 3 has been pulled out of the monitor accommodation case and has been rotated about the first axis X, and is positioned at a position at which a passenger can easily view the monitor. In this state, the first engagement projection 413 is engaged with the engaging hole 418b of the first engagement plate 416, and the second engagement projection 414 is engaged with the engaging hole 420b of the second engagement plate 417.

Figure 21C:
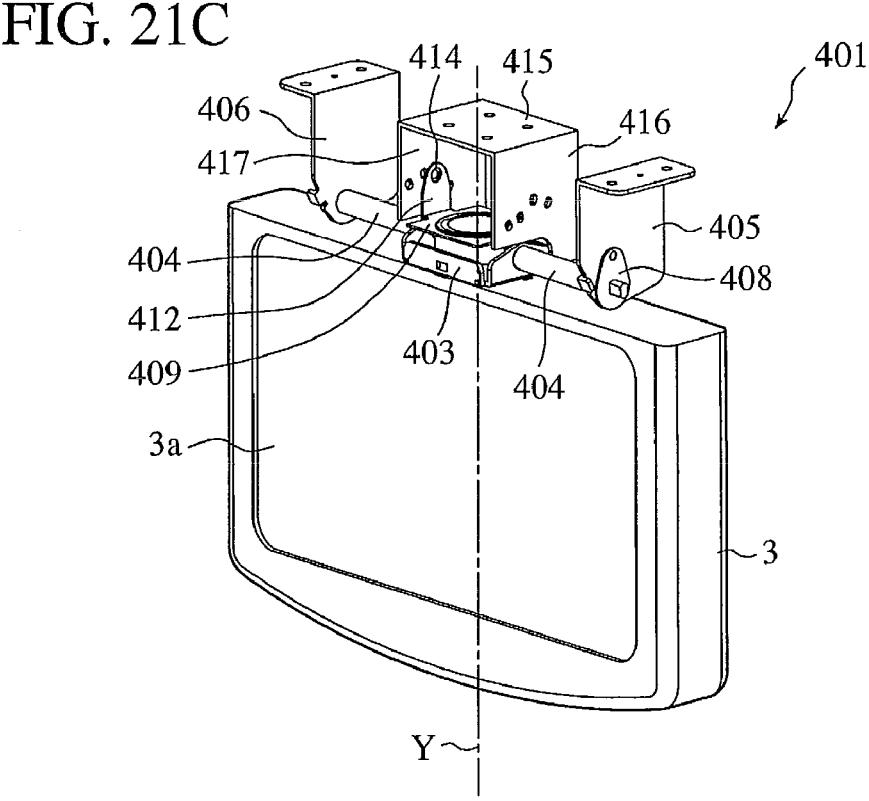
FIG. 21C is a perspective view showing an operating state of the monitor hinge device in accordance with Embodiment 6 in a state in which the monitor has been rotated by 90 degrees with respect to its closed position.
Figure 21D:
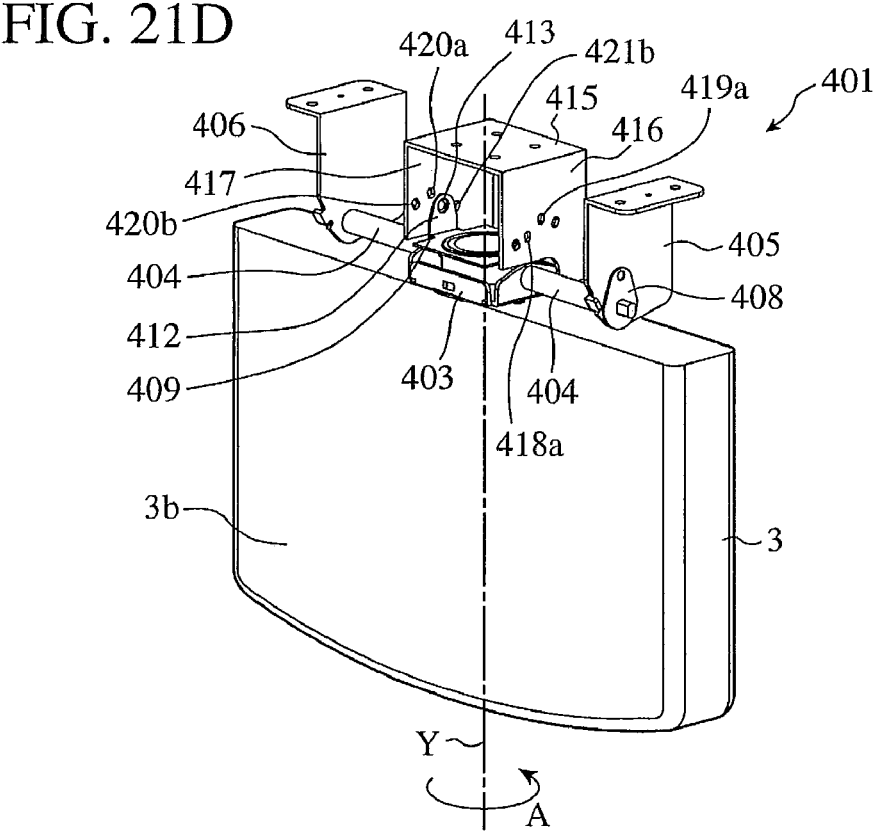
FIG. 21D is a perspective view showing an operating state of the monitor hinge device in accordance with Embodiment 6 in a state in which the monitor is reversed from the state shown in FIG. 5C.

In order to reverse the monitor 3, the monitor 3 is moved to a rotation reference position first, as shown in FIG. 21C. When the monitor 3 is pivoted (i.e. rotated about a second axis Y) in this state, the spring base 409 which is integral with the monitor shaft 402 rotating is also rotated about the second axis Y, and, after that, when the monitor has been reversed (has been rotated by 180 degrees), the monitor hinge device is placed in a state, as shown in FIG. 21D, in which the first engagement projection 413 is pushed against the second engagement plate 417 and the second engagement projection 414 is pushed against the first engagement plate 416.

Figure 21E:
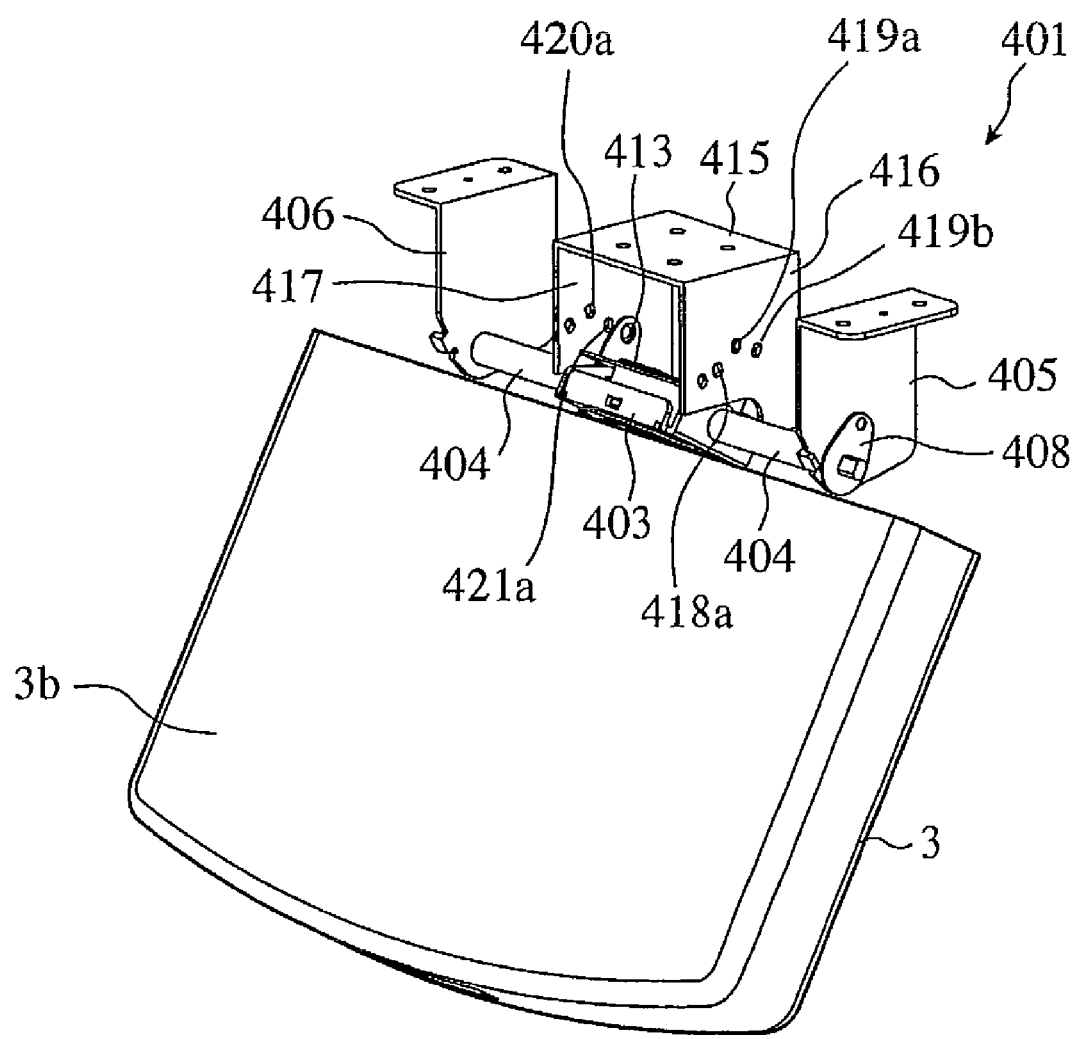
FIG. 21E is a perspective view showing an operating state of the monitor hinge device in accordance with Embodiment 6 in a state in which the monitor in the reversed state has been rotated and is positioned.

When the monitor 3 is rotated about the first axis X in this state, the screen 3a can be placed at a position at which the passenger can easily view the screen. When the monitor 3 is then rotated, the first engagement projection 413 is moved with being pushed against the second engagement plate 417 while the second engagement projection 414 is moved with being pushed against the first engagement plate 416. Then, the first engagement projection 413 is engaged with the engaging hole 421a or 421b formed in the second engagement plate 417 and the second engagement projection 414 is engaged with the engaging hole 419a or 419b formed in the first engagement plate 416, so that the monitor 3 is positioned. FIG. 21E shows the state in which the first engagement projection 413 is engaged with the engaging hole 421b while the second engagement projection 414 is engaged with the engaging hole 419b.

The monitor hinge device 401 in accordance with this Embodiment 6 provides not only the same advantage as that provided by the monitor hinge device of Embodiment 1, but also an advantage of being able to make many parts thereof compact and further simplify its structure since the engagement projections 413 and 414 are disposed on the monitor shaft 402 and the engagement plates 416 and 417 which are respectively engaged with the engagement projections 413 and 414 are also formed of the small bracket 415.

The monitor hinge device in accordance with the present invention can be applied to not only a monitor mounted in a vehicle, such as a car, but also all monitor devices for which requests to change the direction of the screen to watch the screen have been made.

INDUSTRIAL APPLICABILITY

As mentioned above, the monitor hinge device in accordance with the present invention is constructed in such a way as to enable the monitor to rotate in a state in which the monitor is opened, and also enable the monitor to be positioned at a predetermined position in a state in which the monitor's orientation is changed. Therefore, the monitor hinge device in accordance with the present invention is suitable for use in a monitor for backseats disposed in the ceiling in the cabin of a car, and so on.

The invention claimed is:

1. A monitor hinge device characterized in that said monitor hinge device enables a monitor to be opened and closed about a first rotation central axis and also enables said monitor which has been rotated about said first rotation central axis in an opening direction to be rotated about a second rotation central axis perpendicular to said first rotation central axis, and said monitor hinge device includes a pair of brackets disposed on a side of said monitor hinge device where said monitor is mounted, a base supported by these brackets in such a way that said base can be rotated about said first rotation central axis, and an elevator base disposed in such a way as to be able to move in a direction of said second rotation central axis with respect to said base, while a monitor shaft whose center is on said second rotation central axis, a guide screw groove being formed in the motor shaft, is disposed on said monitor and said monitor shaft is rotatably attached to said base and is penetrated through said elevator base, and characterized in that said monitor hinge device further includes a screw engaging mechanism disposed in said elevator base, for being engaged with the guide screw groove of said monitor shaft to move said elevator base in the direction of said second rotation central axis through rotation, and a positioning device disposed between said elevator base and said brackets, for positioning said monitor at a position at which said monitor is rotated by a predetermined amount with respect to said first rotation central axis and for positioning said monitor which has been rotated about said second rotation central axis at a position at which said monitor is rotated by a predetermined amount with respect to said first rotation central axis.

2. The monitor hinge device according to claim 1, characterized in that said second rotation central axis exists in a central part of said monitor which is supported rotatably about said first rotation central axis, and a locking portion of a locking mechanism for fixing said monitor to the side of said monitor hinge device where said monitor is mounted is disposed on said second rotation central axis at an end of said monitor.

3. The monitor hinge device according to claim 1, characterized in that a sliding mechanism for exerting a sliding resistance at a time when said monitor is rotated about said first rotation central axis is disposed.

4. The monitor hinge device according to claim 1, characterized in that said screw engaging mechanism includes engaging pins disposed on said elevator base and engaged with said guide screw groove, positions of said engaging pins being adjustable.

5. The monitor hinge device according to claim 1, characterized in that said positioning device includes a plurality of positioning recesses formed in each of said brackets in such a way as to be located on circumferences of circles whose centers are on said first rotation central axis and having different radiuses associated with an amount of travel of said elevator base, and engagement projections supported by said elevator base, respectively brought into flexible contact with surfaces of said brackets, and each engaged with one of said plurality of positioning recesses through rotation of said monitor about said first rotation central axis.

6. The monitor hinge device according to claim 5, characterized in that said engagement projections are respectively fixed to engagement projection axes disposed in said elevator base, a guide groove including a plurality of circular grooves which are as many as said plurality of positioning recesses and which are formed at an interval in a radial direction between them, the interval having a length which is same as a difference between the radiuses of the circles with the circumferences on which said plurality of positioning recesses are formed, and a groove connecting said plurality of circular grooves and extending in the radial direction is formed in each of said brackets, each of said engagement projection axes to which said engagement projections are respectively fixed is fitted into said guide groove, and a guiding portion for guiding each of said engagement projections is formed in each of connecting portions for connecting between said circular grooves and said groove extending in the radial direction.

7. The monitor hinge device according to claim 1, characterized in that positioning engagement plates are respectively disposed inside said pair of brackets disposed on the side of said monitor hinge device where said monitor is mounted, and positioning recesses are formed in said positioning engagement plate in such a way as to be located on circumferences of circles whose centers are on said first rotation central axis and having different radiuses associated with an amount of travel of said elevator base and engagement projections are disposed on said elevator base in such a way as to be respectively brought into flexible contact with surfaces of said positioning engagement plates, and each engaged with one of said positioning recesses through rotation of said monitor about said first rotation central axis.

8. The monitor hinge device according to claim 1, characterized in that a pair of brackets are disposed on the side of said monitor hinge device where said monitor is mounted, a base is disposed between pair of brackets in such a way as to be able to rotate about a central axis which is said first rotation central axis, a monitor shaft having a central axis which is said second rotation central axis and disposed on said monitor is rotatably attached to said base, a cam plate whose center is on said second rotation central axis is integrally attached to said monitor shaft, a pair of first cam grooves whose positions in a radial direction of the cam plate vary along a circumferential direction of the cam plate are formed in one surface of said cam plate while a pair of second cam grooves whose positions in the radial direction vary along the circumferential direction are formed in another surface of said cam plate, end portions of a pair of first arms extending in parallel with said first rotation central axis, the end portions being opposite to each other, are engaged with said pair of first cam grooves and end portions of a pair of second arms extending in parallel with said first rotation central axis, the end portions being opposite to each other, are engaged with said pair of second cam grooves, and first and second engagement projections which are flexibly forced against said pair of brackets are respectively disposed on other end portions of said first arms and said second arms while a first engaging recess with which said first engagement projection is engaged when said monitor is rotated, by a predetermined amount of rotation, about said second rotation central axis and a second engaging recess with which said second engagement projection is engaged when said monitor is rotated, by a predetermined amount of rotation, about said first rotation central axis in a state in which said monitor has been rotated, about said second rotation central axis are formed in each of said brackets.

9. The monitor hinge device according to claim 1, characterized in that a direction-of-rotation converting mechanism for rotating said first rotation central axis when said monitor is rotated about said second rotation central axis is disposed, and a cam engaging member having an engagement projection is disposed integrally with said first rotation central axis while a cam portion supported on the side of said monitor hinge device where said monitor is disposed, and having an engagement groove with which said engagement projection is engaged when said monitor is rotated, by a predetermined amount of rotation, about said first rotation central axis, and an engagement groove with which said engagement projection is engaged when said monitor is rotated, by a predetermined amount of rotation, about said second rotation central axis and said monitor is further rotated, by a predetermined amount of rotation, about said first rotation central axis is disposed, and characterized in that said monitor hinge device further includes a pressing device for forcing said engagement projection against said engagement groove flexibly.

10. The monitor hinge device according to claim 1, characterized in that engagement projections having different distances from said first rotation central axis are disposed on said monitor shaft while an engagement plate associated with said different engagement projections is disposed on a side of said monitor hinge device where said monitor is supported, and an engagement groove with which one of said engagement projections is engaged when said monitor is rotated, by a predetermined amount of rotation, about said second rotation central axis and an engagement groove with which the other engagement projection is engaged when said monitor is rotated, by a predetermined amount of rotation, about said first rotation central axis in a state in which said monitor has been rotated, about said second rotation central axis are formed in said engagement plate, and characterized in that said monitor hinge device further includes a pressing device for forcing said engagement projections against said engagement grooves flexibly.

* * * * *